US012227405B2

(12) United States Patent
Kuo et al.

(10) Patent No.: US 12,227,405 B2
(45) Date of Patent: Feb. 18, 2025

(54) FLUID MATERIAL DISPENSING APPARATUS FOR AUTOMATICALLY DISCARDING UNQUALIFIED MATERIALS

(71) Applicant: Botrista, Inc., Dover, DE (US)

(72) Inventors: Wu-Chou Kuo, San Francisco, CA (US); Yu-Min Lee, Taipei (TW); Yu Wei Chen, San Francisco, CA (US)

(73) Assignee: BOTRISTA, INC., Dover, DE (US)

( * ) Notice: Subject to any disclaimer, the term of this patent is extended or adjusted under 35 U.S.C. 154(b) by 0 days.

(21) Appl. No.: 18/763,795

(22) Filed: Jul. 3, 2024

(65) Prior Publication Data

US 2024/0351851 A1 Oct. 24, 2024

Related U.S. Application Data

(60) Continuation-in-part of application No. 18/375,075, filed on Sep. 29, 2023, now Pat. No. 12,077,423, (Continued)

(51) Int. Cl.
*B67D 1/07* (2006.01)
*B67D 1/12* (2006.01)

(52) U.S. Cl.
CPC ............. *B67D 1/07* (2013.01); *B67D 1/1277* (2013.01)

(58) Field of Classification Search
CPC ................................ B67D 1/07; B67D 1/1277
See application file for complete search history.

(56) References Cited

U.S. PATENT DOCUMENTS 6,669,051 B1 12/2003 Phallen et al.
6,695,168 B2 2/2004 Pinedjian et al.
(Continued)

FOREIGN PATENT DOCUMENTS

CN 102781293 A 11/2012
CN 104154267 A 11/2014
(Continued)

OTHER PUBLICATIONS

Chinese Office Action and Search Report for Chinese Application No. 202111040353.0, dated Jan. 27, 2024, with partial English translation.
(Continued)

*Primary Examiner* — Jeremy Carroll
(74) *Attorney, Agent, or Firm* — Birch, Stewart, Kolasch & Birch, LLP

(57) ABSTRACT

A material dispensing device includes: a target nozzle for dispensing a target material to a target container; a pump arranged to operably extract the target material from the material container and to operably push the target material to flow toward the target nozzle; a material drainage port; a flow direction switch device, coupled with the target nozzle and the material drainage port, and arranged to operably receive the target material; and a control circuit. When the material dispensing device needs to output the target material to the target container, if the control circuit determines that a temperature of the target material inside the material dispensing device reaches a predetermined temperature, the control circuit controls the flow direction switch device to guide the target material to flow toward the target nozzle, so as to dispense the target material into the target container through the target nozzle.

16 Claims, 12 Drawing Sheets

Related U.S. Application Data which is a division of application No. 17/467,960, filed on Sep. 7, 2021, now Pat. No. 11,814,280, which is a continuation-in-part of application No. 17/218,314, filed on Mar. 31, 2021, now Pat. No. 11,597,642.

(60) Provisional application No. 63/636,426, filed on Apr. 19, 2024, provisional application No. 63/143,217, filed on Jan. 29, 2021, provisional application No. 63/110,621, filed on Nov. 6, 2020.

(56) References Cited

U.S. PATENT DOCUMENTS

| | | | | |
|---|---|---|---|---|
| 10,561,281 | B1 | 2/2020 | Lu | |
| 10,662,053 | B2 | 5/2020 | Petermann | |
| 10,689,239 | B1 | 6/2020 | Siegel | |
| 11,407,629 | B1 | 8/2022 | Siegel | |
| 2007/0151992 | A1* | 7/2007 | Carlson | B67D 1/0867 222/509 |
| 2008/0141702 | A1* | 6/2008 | Gagliano | B67D 1/1275 62/389 |
| 2010/0176147 | A1* | 7/2010 | Segers | B67D 1/0837 222/1 |
| 2011/0049185 | A1 | 3/2011 | Buchik | |
| 2016/0297665 | A1 | 10/2016 | Petermann | |
| 2016/0368752 | A1* | 12/2016 | Bethuy | B67D 1/0869 |
| 2018/0146835 | A1 | 5/2018 | Alexander et al. | |
| 2021/0316979 | A1 | 10/2021 | Hayes-Pankhurst et al. | |

FOREIGN PATENT DOCUMENTS

| | | |
|---|---|---|
| CN | 102781293 B | 8/2015 |
| WO | WO 2011/107574 A2 | 9/2011 |

OTHER PUBLICATIONS

Taiwanese Notice of Allowance dated Dec. 10, 2021 for Application No. 110133099 with an English translation.
Taiwanese Office Action and Search Report, dated Jul. 14, 2021, for Taiwanese Application No. 110112000, with a partial English translation of the Taiwanese Office Action and a full English translation of the Taiwanese Search Report.
US Office Action for U.S. Appl. No. 18/763,872, dated Sep. 29, 2024.

* cited by examiner

FLUID MATERIAL DISPENSING APPARATUS FOR AUTOMATICALLY DISCARDING UNQUALIFIED MATERIALS

CROSS-REFERENCE TO RELATED APPLICATIONS

This application is a Continuation-In-Part of and claims the benefit of priority to co-pending U.S. patent application Ser. No. 18/375,075, filed on Sep. 29, 2023, which is a Divisional of U.S. patent application Ser. No. 17/467,960, filed on Sep. 7, 2021, now U.S. Pat. No. 11,814,280, issued on Nov. 14, 2023, which is a Continuation-In-Part of and claims the benefit of priority to U.S. patent application Ser. No. 17/218,314, filed on Mar. 31, 2021, now U.S. Pat. No. 11,597,642, issued on Mar. 7, 2022; which claims the benefit of U.S. Provisional Application Ser. No. 63/110,621, filed on Nov. 6, 2020, and also claims the benefit of U.S. Provisional Application Ser. No. 63/143,217, filed on Jan. 29, 2021; the entirety of which is incorporated herein by reference for all purposes.

This application claims the benefit of priority to U.S. Provisional Application Ser. No. 63/636,426, filed on Apr. 19, 2024; the entirety of which is incorporated herein by reference for all purposes.

BACKGROUND

The disclosure generally relates to a fluid material dispensing apparatus and, more particularly, to a fluid material dispensing apparatus capable of automatically discarding unqualified materials.

For many consumers, freshly made beverages are more attractive than factory-produced canned or bottled beverages in many aspects, such as freshness, taste, and/or flexibility of customizing ingredient combinations. Therefore, many restaurants and beverage vendors offer a variety of freshly made beverages to meet the needs of their customers. The traditional approach of manually preparing freshly made beverages has many disadvantages. For example, it is not easy to maintain the taste consistency of freshly made beverages, personnel training requires considerable time and cost, and the preparation of the freshly made beverages often consumes a lot of labor time, or the like. As a result of rising labor costs and other factors (e.g., increased operating costs due to the impact of the pandemic or inflation), many restaurants and beverage vendors have begun to use a variety of machinery and equipment to provide or assist in the preparation of freshly-made beverages in order to reduce the required labor time and costs.

It is well-known that in traditional beverage dispensing machines, various materials are transported from the material containers to output terminals through various pipelines, and then dispensed from the output terminals. When the beverage dispensing machine stops dispensing materials, a portion of the materials remains in the corresponding pipelines. For certain materials, staying in the pipelines for too long can lead to a deterioration in quality, such as loss of freshness, inappropriate temperature, insufficient carbonation, or spoilage. If the beverage dispensing machine dispenses these materials to make beverages, it can negatively affect the quality or taste of the resulting beverages and may even pose a food safety risk. From another perspective, the above situation also makes it difficult for the traditional beverage dispensing machines to ensure that the quality or freshness of the resulting beverages meets requirements.

SUMMARY

An example embodiment of a material dispensing device is disclosed, comprising: a target nozzle, arranged to operably dispense a target material to a target container; a pump, coupled between an outlet connector of a material container and the target nozzle, and arranged to operably extract the target material from the material container and to operably push the target material to flow toward the target nozzle; a material drainage port; a flow direction switch device, comprising: an input terminal, arranged to operably receive the target material; a first output terminal, coupled with the target nozzle; and a second output terminal, coupled with the material drainage port; and a control circuit, coupled with the pump and the flow direction switch device, and arranged to operably control the pump and the flow direction switch device; wherein when the material dispensing device needs to output the target material to the target container, if the control circuit determines that a temperature of the target material inside the material dispensing device reaches a predetermined temperature, the control circuit controls the flow direction switch device to guide the target material to flow toward the target nozzle through the first output terminal, so as to dispense the target material into the target container through the target nozzle.

Another example embodiment of a material dispensing device is disclosed, comprising: a target nozzle, arranged to operably dispense a target material to a target container; a pump, coupled between an outlet connector of a material container and the target nozzle, and arranged to operably extract the target material from the material container and to operably push the target material to flow toward the target nozzle; a flowmeter, arranged to operably measure a flow of the target material to be dispensed to the target container through the target nozzle; a material drainage port; a flow direction switch device, comprising: an input terminal, arranged to operably receive the target material; a first output terminal, coupled with the target nozzle; and a second output terminal, coupled with the material drainage port; a control circuit, coupled with the pump, the flowmeter, and the flow direction switch device, and arranged to operably control the pump and the flow direction switch device; and one or more temperature sensors, coupled with the control circuit, and arranged to operably sense and report the temperature of the target material inside the material dispensing device to the control circuit; wherein when the material dispensing device needs to output the target material to the target container, if the control circuit determines that a temperature of the target material inside the material dispensing device reaches a predetermined temperature, the control circuit controls the flow direction switch device to guide the target material to flow toward the target nozzle through the first output terminal, so as to dispense the target material into the target container through the target nozzle.

Another example embodiment of a material dispensing device is disclosed, comprising: a target nozzle, arranged to operably dispense a target material to a target container; a pump, coupled between an outlet connector of a material container and the target nozzle, and arranged to operably extract the target material from the material container and to operably push the target material to flow toward the target nozzle; a material drainage port; a flow direction switch device, comprising: an input terminal, arranged to operably receive the target material; a first output terminal, coupled with the target nozzle; and a second output terminal, coupled with the material drainage port; and a control circuit, coupled with the pump and the flow direction switch device, and arranged to operably control the pump and the flow direction switch device; wherein when the material dispensing device needs to output the target material to the target container, if the control circuit determines that a quality of the target material inside the material dispensing device is acceptable, the control circuit controls the flow direction switch device to guide the target material to flow toward the target nozzle through the first output terminal, so as to dispense the target material into the target container through the target nozzle.

Another example embodiment of a material dispensing device is disclosed, comprising: a target nozzle, arranged to operably dispense a target material to a target container; a pump, coupled between an outlet connector of a material container and the target nozzle, and arranged to operably extract the target material from the material container and to operably push the target material to flow toward the target nozzle; a damper device, coupled between the outlet connector and the target nozzle, and arranged to operably buffer the target material flowing through the damper device; a material drainage port; a flow direction switch device, comprising: an input terminal, arranged to operably receive the target material; a first output terminal, coupled with the target nozzle; and a second output terminal, coupled with the material drainage port; a flowmeter, arranged to operably measure a flow of the target material to be transmitted to the flow direction switch device; and a control circuit, coupled with the pump, the flowmeter, and the flow direction switch device, and arranged to operably control the pump and the flow direction switch device; wherein the control circuit comprises: a timer, arranged to operably record a duration of time for the pump outputting the target material, a duration of time for the damper device outputting the target material, a duration of time for the flowmeter outputting the target material, or a duration of time for the flow direction switch device outputting the target material to the material drainage port, and to operably generate a corresponding time-length value; wherein when the time-length value reaches a predetermined value, the control circuit determines that a quality of the target material inside the material dispensing device is acceptable, and controls the flow direction switch device to guide the target material to flow toward the target nozzle through the first output terminal, so as to dispense the target material into the target container through the target nozzle.

Another example embodiment of a material dispensing device is disclosed, comprising: a target nozzle, arranged to operably dispense a target material to a target container; a pump, coupled between an outlet connector of a material container and the target nozzle, and arranged to operably extract the target material from the material container and to operably push the target material to flow toward the target nozzle; a first flowmeter, arranged to operably measure a flow of the target material to be dispensed to the target container through the target nozzle; a material drainage port; a flow direction switch device, comprising: an input terminal, arranged to operably receive the target material; a first output terminal, coupled with the target nozzle; and a second output terminal, coupled with the material drainage port; and a second flowmeter, coupled between the second output terminal of the flow direction switch device and the material drainage port, and arranged to operably measure a flow of the target material to be transmitted to the material drainage port to generate a corresponding measurement value; a control circuit, coupled with the pump, the first flowmeter, the flow direction switch device, and the second flowmeter, and arranged to operably control the pump and the flow direction switch device; wherein when the measurement value reaches a predetermined threshold, the control circuit determines that a quality of the target material inside the material dispensing device is acceptable, and controls the flow direction switch device to guide the target material to flow toward the target nozzle through the first output terminal, so as to dispense the target material into the target container through the target nozzle.

Both the foregoing general description and the following detailed description are examples and explanatory only, and are not restrictive of the invention as claimed.

DETAILED DESCRIPTION

Reference is made in detail to embodiments of the invention, which are illustrated in the accompanying drawings. The same reference numbers may be used throughout the drawings to refer to the same or like parts, components, or operations.

Figure 1:
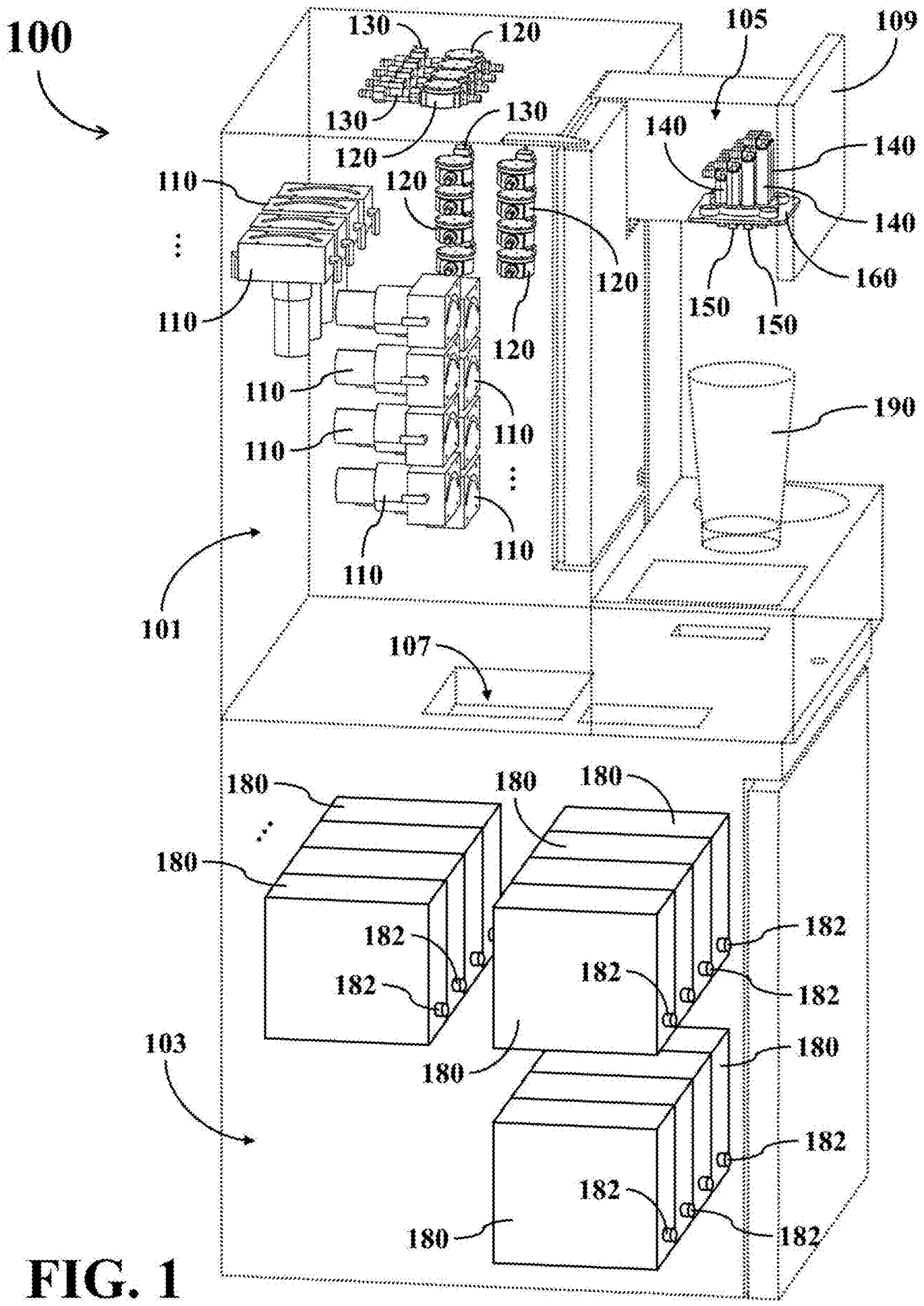
FIG. 1 shows a simplified schematic perspective diagram of a fluid material dispensing apparatus according to one embodiment of the present disclosure.
Figure 2:
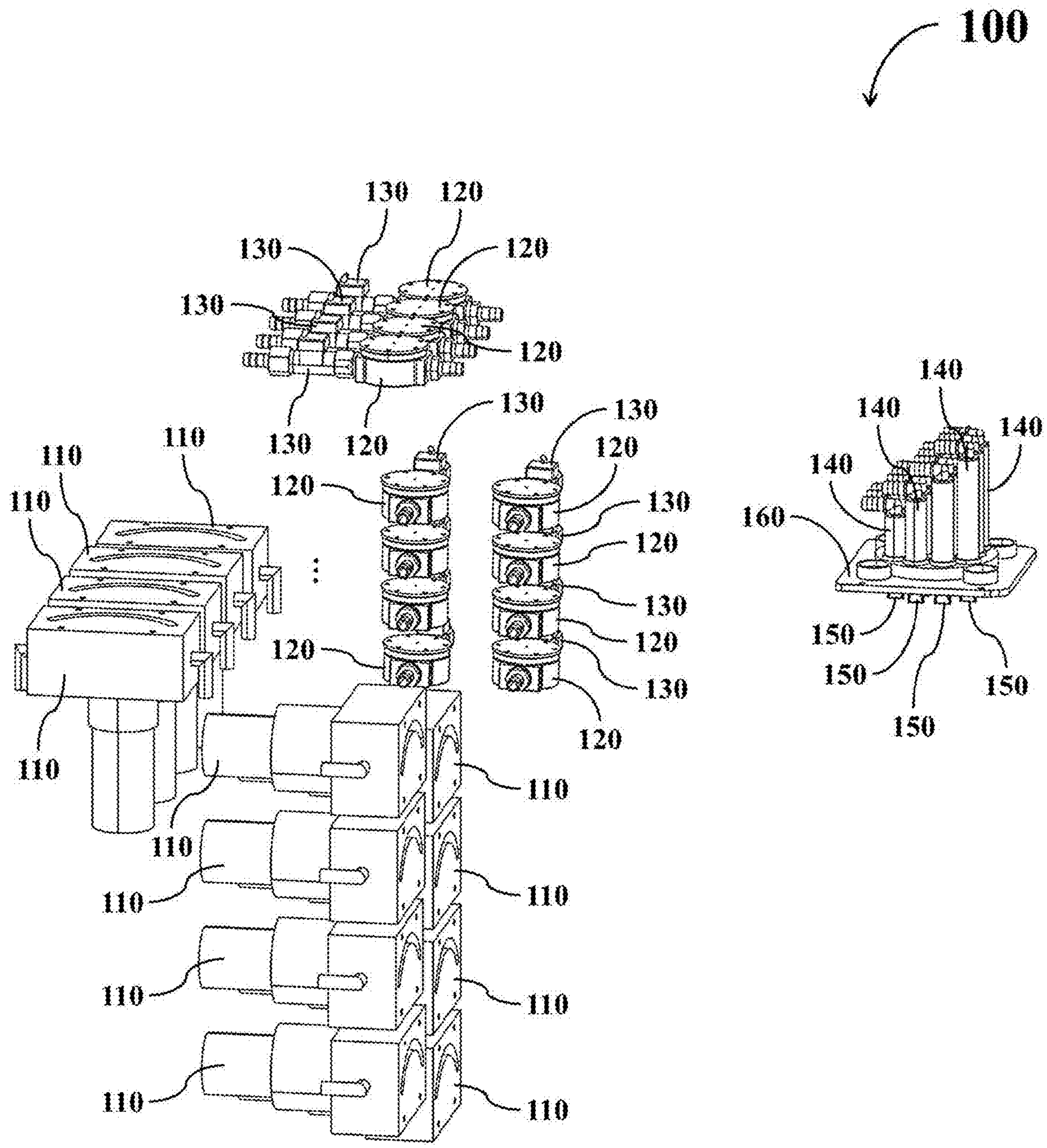
FIGS. 2~3 show simplified schematic diagrams illustrating spatial arrangement of some components of the fluid material dispensing apparatus of FIG. 1 from different viewing angles.
Figure 3:
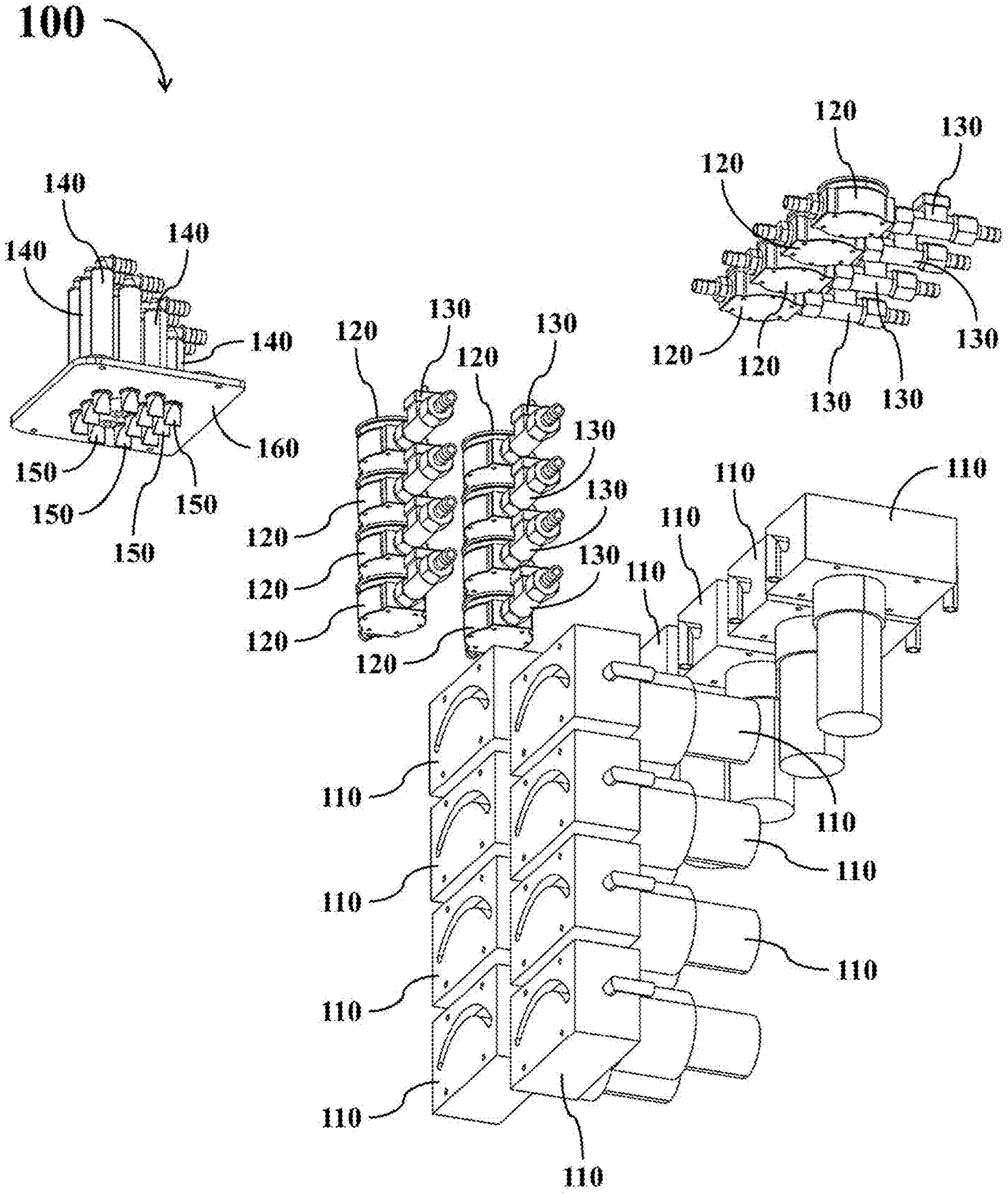

Please refer to FIG. 1 through FIG. 3. FIG. 1 shows a simplified schematic perspective diagram of a fluid material dispensing apparatus 100 according to one embodiment of the present disclosure. FIGS. 2-3 show simplified schematic diagrams illustrating spatial arrangement of some components of the fluid material dispensing apparatus 100 from different viewing angles. The fluid material dispensing apparatus 100 may be utilized to automatically conduct beverage preparation operations to make beverages or output various fluid materials (e.g., various sauces) for use in food seasoning.

In the embodiment of FIG. 1, the fluid material dispensing apparatus 100 comprises an upper chamber 101, a lower chamber 103, a neck chamber 105, one or more connecting channels 107, and a control panel 109. In order to reduce the complexity of the drawing contents, the appearance outline of the fluid material dispensing apparatus 100 is deliberately represented by dashed lines in FIG. 1, while some internal objects to be further described in the following are depicted with solid lines. Please note that the appearance shape of the fluid material dispensing apparatus 100 is merely a simplified exemplary embodiment for the purpose of explanatory convenience, rather than a restriction to the actual appearance of the fluid material dispensing apparatus 100.

The upper chamber 101 of the fluid material dispensing apparatus 100 may be connected to the neck chamber 105, and may be connected to the lower chamber 103 through the connecting channel 107. Relevant wires, signal lines, connectors, and/or material transmission pipes may be arranged inside the fluid material dispensing apparatus 100 in a variety of appropriate ways.

As shown in FIG. 1 through FIG. 3, the fluid material dispensing apparatus 100 further comprises a plurality of pumps 110, a plurality of damper devices 120, a plurality of flowmeters 130, a plurality of material output tubes 140, a plurality of nozzles 150, and a connecting plate 160.

Each of the aforementioned pumps 110 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned damper devices 120 and flowmeters 130 may be connected to other components through various material transmission pipes and connectors, and may be installed within the upper chamber 101, the lower chamber 103, and/or the neck chamber 105 in a variety of appropriate spatial arrangements, not restricted to the spatial arrangement shown in FIG. 1 through FIG. 3.

Each of the aforementioned material output tubes 140 may be connected to other components through various material transmission pipes and connectors, and may be installed within the neck chamber 105 in a variety of appropriate spatial arrangements, not restricted to the spatial arrangement shown in FIG. 1 through FIG. 3.

The aforementioned nozzles 150 may be detachably arranged on the connecting plate 160 through various appropriate connections, and the connecting plate 160 may be detachably arranged beneath the neck chamber 105 through various appropriate connections, not restricted to the spatial arrangement shown in FIG. 1 through FIG. 3. In addition, the input terminal of each nozzle 150 may be connected to the output terminal of a corresponding material output tube 140 through various material transmission pipes and connectors. The output terminals of respective nozzles 150 and the connecting plate 160 can be exposed outside the neck chamber 105 to facilitate the user to carry out relevant cleaning procedures.

As shown in FIG. 1, multiple material containers 180 may be placed within the lower chamber 103 of the fluid material dispensing apparatus 100. Different material containers 180 may be utilized to store different fluid materials. For example, the aforementioned fluid material may be common beverage base materials, such as water, sparkling water, black tea, green tea, soy milk, milk, milk-based liquids, coffee, nut pulps, various fruit-based concentrates, various vegetable-based concentrates, or the like.

For another example, the aforementioned fluid material may be various syrups, such as agave syrup, dulce de leche, fructose, golden syrup, lemonade syrups, maltose syrup, maple syrup, molasses, orgeat, and/or palm syrup, or the like.

For yet another example, the aforementioned fluid material may be various alcoholic beverages, such as beer, cocktails, and/or sake, or the like.

For yet another example, the aforementioned fluid material may be various sauces or fluid condiments, such as apple sauce, chutneys, cranberry sauce, salad dressings, fruit coulis, ketchup, tomato sauce, mayonnaise, meat gravies, miso sauce, hummus, pasta sauce, piccalilli, soy sauce, spices sauce, spicy sauce, and/or ginger jam, or the like.

For yet another example, the aforementioned fluid material may be various fluid materials, such as fruit juices containing fruit pulps, tea liquids with small particles (e.g., pearl or tapioca balls), honey, cooking oils, vinegar, jams, marmalade, pressed fruit paste, beer vinegar, buttercream, condensed milk, and/or cream, or the like.

As can be appreciated from the foregoing descriptions, the fluid material that the fluid material dispensing apparatus 100 can output may be fluid having higher viscosity than water, and may be fluid having lower viscosity than water.

Each material container 180 has an outlet connector 182, which may be connected to a corresponding component (e.g., a corresponding pump 110 or a corresponding damper device 120) through various material transmission pipes and connectors.

In other embodiments, all of or some of the material containers 180 may be instead placed within the upper chamber 101, without being restricted to the spatial arrangement shown in FIG. 1. In practice, appropriate refrigeration equipment may be installed within the fluid material dispensing apparatus 100 to extend the storage time of various fluid materials.

Please note that the quantity of the pumps 110, the damper devices 120, the flowmeters 130, the material output tubes 140, the nozzles 150, the connecting plate 160, and the material containers 180 shown in FIG. 1 through FIG. 3 is merely an exemplary embodiment, rather than a restriction to the practical implementations.

Figure 4:
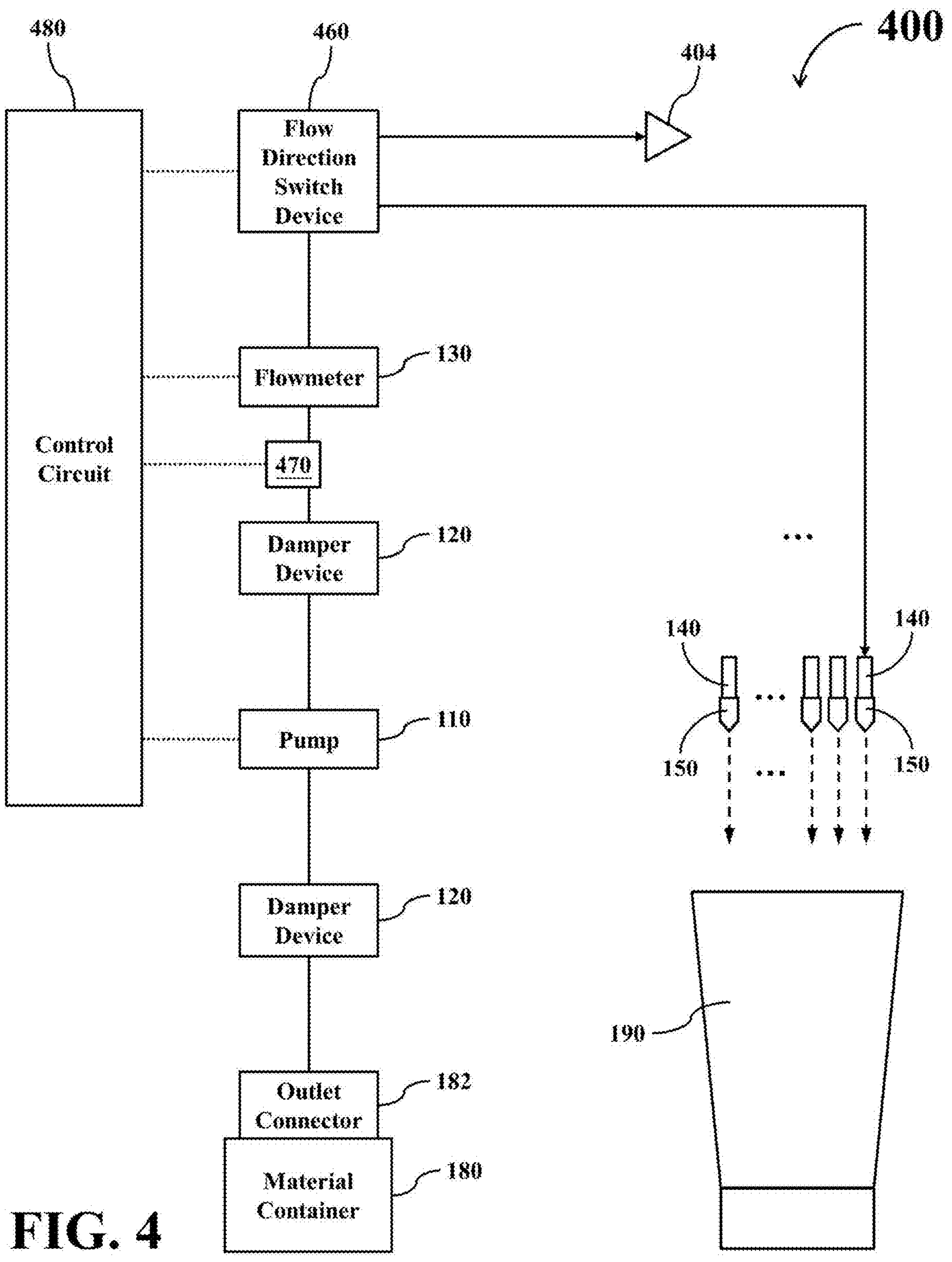
FIG. 4 shows a simplified functional block diagram of a material dispensing device of FIG. 1 according to a first embodiment of the present disclosure.

Please refer to FIG. 4, which shows a simplified functional block diagram of a material dispensing device 400 in the fluid material dispensing apparatus 100 according to one embodiment of the present disclosure. The fluid material dispensing apparatus 100 comprises multiple material dispensing devices 400, which are respectively responsible for delivering the fluid materials stored in different material containers 180 to the output terminals of corresponding nozzles 150.

Each material dispensing device 400 comprises a pump 110, one or more damper devices 120, a flowmeter 130, a material output tube 140, a corresponding nozzle 150, and a control circuit 480, wherein the pump 110, the one or more damper devices 120, the flowmeter 130, the material output tube 140, and the corresponding nozzle 150 may be connected by appropriate material transmission pipes and connectors to form a material transmission channel for transporting and dispensing a corresponding fluid material stored in a corresponding material container 180.

In order to reduce the complexity of the drawing contents, only one exemplary material dispensing device 400 is shown in FIG. 4 as an example for explanation, and other structures and devices of the fluid material dispensing apparatus 100 are not shown in FIG. 4. The components and operating mechanism of the material dispensing device 400 can be applied to other material dispensing devices in the fluid material dispensing apparatus 100.

In the material dispensing device 400, the pump 110 is coupled with the control circuit 480, and arranged to operably push received fluid material (hereinafter, target material) to flow forward under control of the control circuit 480. In practice, the pump 110 may be realized with various appropriate pump devices capable of pushing fluid forward, such as a peristaltic pump, a diaphragm pump, a rotary diaphragm pump, or the like.

A material inlet of the pump 110 may be coupled with the outlet connector 182 of a corresponding material container 180 through appropriate connectors and material transmission pipes, and arranged to operably receive the target material transmitted from the corresponding material container 180 through the outlet connector 182.

The damper device 120 is arranged to operably conduct a buffering operation on the target material flowing through the damper device 120. In some embodiments, an input terminal of the damper device 120 is coupled with a material outlet of the pump 110. In other words, the damper device 120 may be located at the subsequent stage of the pump 110. In practice, the damper device 120 may be directly connected to the material outlet of the pump 110, or may be indirectly connected to the material outlet of the pump 110 through other appropriate connectors and material transmission pipes.

During the operations of the aforementioned pump 110, the target material may be intermittently pushed forward, and thus the liquid pressure at the material outlet of the pump 110 exhibits periodic fluctuations. Such a situation will cause the amount of the target material flowing into the damper device 120 to exhibit periodic fluctuations.

When the volume of the target material in the damper device 120 exceeds a predetermined amount (i.e., the nominal volume of the damper device 120), a buffer chamber of the damper device 120 will temporarily deform to expand, so that the amount of the target material in the damper device 120 can temporarily exceed the nominal volume of the damper device 120. Over time, the elastic restoring force of the buffer chamber will push the target material in the damper device 120 to gradually flow toward the output terminal of the damper device 120, so that the amount of the target material in the damper device 120 will drop back to a level close to its nominal volume.

The flowmeter 130 is coupled with the control circuit 480, and arranged to operably measure a flow of target material to be dispensed to the target container 190 through the target nozzle 150, so that the control circuit 480 can precisely control the volume of target material to be dispensed to the target container 190. The flowmeter 130 may be arranged at any appropriate position between the outlet connector 182 and the nozzle 150. For example, the flowmeter 130 of this embodiment may be coupled with the output terminal of the damper device 120, and arranged to operably measure the flow of target material passing through the flowmeter 130. In other words, the flowmeter 130 may be located at the subsequent stage of the damper device 120. In practice, the flowmeter 130 may be directly connected to the output terminal of the damper device 120, or may be indirectly connected to the output terminal of the damper device 120 through other appropriate connectors and material transmission pipes.

The material output tube 140 may be coupled with the output terminal of the flowmeter 130, and arranged to operably transmit the received target material toward the corresponding nozzle 150. In practice, the material output tube 140 may be indirectly connected to the output terminal of the flowmeter 130 through a connector with other appropriate material transmission pipes to increase the selection flexibility of the position of the material output tube 140.

The nozzle 150 is coupled with the output terminal of the material output tube 140, and arranged to operably output the target material transmitted from the material output tube 140 to the target container 190. In practice, the nozzle 150 may be directly connected to the output terminal of the material output tube 140, or may be indirectly connected to the output terminal of the material output tube 140 through the aforementioned connecting plate 160 or other appropriate material transmission pipes. The nozzle 150 may be realized with a duckbill valve, a check valve, or other appropriate outlet connector.

As described previously, the damper device 120 conducts a buffering treatment to the target material flowing through the damper device 120 with the deformation and elastic restoring force of its buffer chamber. Accordingly, both the flow speed variation and the liquid pressure variation of the target material leaving the output terminal of the damper device 120 will be apparently lower than the flow speed variation and liquid pressure variation of the target material received by the input terminal of the damper device 120. Such structure is beneficial for improving the measuring accuracy of the flowmeter 130 in measuring the flow of the target material passing through the flowmeter 130, thereby effectively increasing the liquid volume control accuracy of the material dispensing device 400 for fluid material to be dispensed.

If the aforementioned damper device 120 is omitted, both the flow speed variation and the liquid pressure variation of the target material flowing through the flowmeter 130 will become greater. Such a situation will cause a negative impact to the measuring accuracy of the flowmeter 130 in measuring the flow of the target material, thereby reducing the flow measurement accuracy of the flowmeter 130.

Please note that the structure and connections between components of the material dispensing device 400 described previously is merely an exemplary embodiment, rather than a restriction to the practical implementations of the material dispensing device 400.

In another embodiment, for example, the damper device 120 and the flowmeter 130 may be instead located at the prior stage of the pump 110. Specifically, the input terminal of the damper device 120 may instead be coupled with the outlet connector 182 of a corresponding material container 180 through appropriate connectors and material transmission pipes, so as to receive the target material transmitted from the corresponding material container 180. On the other hand, the material inlet of the pump 110 may instead be coupled with the output terminal of the flowmeter 130, so as to receive the target material passed through the flowmeter 130. That is, the flowmeter 130 is coupled between the damper device 120 and the pump 110 in this embodiment. In practice, the material inlet of the pump 110 may be directly connected to the output terminal of the flowmeter 130, or may be indirectly connected to the output terminal of the flowmeter 130 through appropriate connectors or material transmission pipes.

In yet another embodiment, the damper device 120 may be instead located at the prior stage of the pump 110 and the flowmeter 130 may be instead located at the prior stage of the damper device 120. Specifically, the input terminal of the flowmeter 130 is coupled with the outlet connector 182 of a corresponding material container 180, the input terminal of the damper device 120 is coupled with the output terminal of the flowmeter 130, and the material inlet of the pump 110 is coupled with the output terminal of the damper device 120.

In yet another embodiment, a first damper device 120 is coupled with the material outlet of the pump 110, while a second damper device 120 is coupled between the outlet connector 182 and the material inlet of the pump 110 as shown in FIG. 4. That is, the material dispensing device 400 may comprise two damper devices 120. In this embodiment, the flowmeter 130 may be coupled with the output terminal of the first damper device 120, or coupled between the output terminal of the second damper device 120 and the material inlet of the pump 110.

It can be appreciated from the foregoing elaborations, by utilizing the damper device 120 to conduct a buffering operation on the target material flowing therethrough, the measurement accuracy of the flowmeter 130 in measuring the flow of the target material outputted from the damper device 120 can be significantly improved, thereby effectively increasing the output volume control accuracy of the material dispensing device 400 for fluid materials to be dispensed.

Even if the fluid materials employed by the fluid material dispensing apparatus 100 are liquids having a viscosity higher than water, for example, honey, various syrups, soy milks, nut pulps, fruit juice concentrates, fruit juices containing fruit pulps, tea-based liquids containing small particles (e.g., bubbles or tapioca balls), milk-based liquids, cooking oils, or other thick fluid material (e.g., various sauces) and so on, the usage amount of corresponding fluid material can be accurately measured and manipulated by adopting the disclosed material dispensing device 400 described previously.

It can be appreciated from the foregoing descriptions that the target material is transported from the corresponding material container 180 to the nozzle 150 through the material transmission channel of the material dispensing device 400. When the material dispensing device 400 stops dispensing target materials, a portion of the target materials remains in the corresponding material transmission channels. For some materials, staying in the material transmission channels for too long can lead to a deterioration in quality, such as loss of freshness, inappropriate temperature, insufficient carbonation, or spoilage. If the material dispensing device 400 dispenses these materials to make beverages, it may negatively affect the quality or taste of the resulting beverages and may even pose a food safety risk.

In order to resolve the above problem, the material dispensing device 400 adopts a material quality control mechanism to automatically exclude and discard unqualified materials when making beverages. In this way, the fluid material dispensing apparatus 100 can prevent unqualified materials from being dispensed to the target container 190, so as to ensure that the quality and freshness of the resulting beverages can meet requirements.

As shown in FIG. 4, the material dispensing device 400 further comprises a flow direction switch device 460 and a temperature sensor 470. The flow direction switch device 460 is coupled with the control circuit 480, and has an input terminal, a first output terminal, and a second output terminal. The input terminal is coupled with the outlet connector 182 of the corresponding material container 180 through appropriate connectors and material transmission pipes, and arranged to operably receive the target material output from the outlet connector 182. The first output terminal is coupled with the target nozzle 150 through the material output tube 140 and various appropriate connectors and/or pipes, and arranged to operably output received target material to the target nozzle 150. The second output terminal is coupled with a material drainage port 404 through various appropriate connectors and/or pipes, and arranged to operably output received target material to the material drainage port 404.

The flow direction switch device 460 is arranged to operably decide where the target material received by the flow direction switch device 460 should flow toward. In this embodiment, the flow direction switch device 460 is only allowed to output received target material toward either the target nozzle 150 or the material drainage port 404 under control of the control circuit 480. That is, when the first output terminal of the flow direction switch device 460 outputs target material to the target nozzle 150, the second output terminal of the flow direction switch device 460 does not (or is unable to) output target material to the material drainage port 404. On the contrary, when the second output terminal of the flow direction switch device 460 outputs target material to the material drainage port 404, the first output terminal of the flow direction switch device 460 does not (or is unable to) output target material to the target nozzle 150.

In practice, the source selection device 430 may be realized with various appropriate valves, such as various three-way valves.

The temperature sensor 470 is coupled with the control circuit 480, and arranged to operably sense and report the temperature of the target material inside the material dispensing device 400 (i.e., to sense the temperature of the target material inside the material transmission channel between the outlet connector 182 and the flow direction switch device 460) to the control circuit 480. In practice, the temperature sensor 470 may be arranged in any appropriate position inside the material transmission channel between the outlet connector 182 and the flow direction switch device 460. Alternatively, the temperature sensor 470 may be attached on any appropriate position on the surface of the material transmission channel between the outlet connector 182 and the flow direction switch device 460.

In the embodiment of FIG. 4, the temperature sensor 470 is positioned between the damper device 120 and the flowmeter 130, and arranged to operably sense the temperature of the target material to be transmitted from the damper device 120 to the flowmeter 130.

When the fluid material dispensing apparatus 100 requires the material dispensing device 400 to add target material to the target container 190, the control circuit 480 evaluates the quality of the target material inside the material dispensing device 400, and controls the operation of the flow direction switch device 460 (e.g., the material output direction of the flow direction switch device 460) according to the quality evaluation of the target material inside the material dispensing device 400.

As described previously, the control circuit 480 of this embodiment is enabled to obtain the temperature of the target material inside the material dispensing device 400 based on the sensing result of the temperature sensor 470. In this embodiment, when the material dispensing device 400 needs to output target material to the target container 190, the control circuit 480 evaluates the quality of the target material inside the material dispensing device 400 based on the sensing result of the temperature sensor 470. If the control circuit 480 determines that the temperature of the target material inside the material dispensing device 400 reaches a predetermined temperature, the control circuit 480 would determine that the quality of the target material currently inside the material dispensing device 400 is acceptable. In this situation, the control circuit 480 deems the target material currently inside the material dispensing device 400 as qualified target material, and controls the flow direction switch device 460 to guide the target material to flow toward the target nozzle 150 through the first output terminal, so that the target nozzle 150 can dispense qualified target material into the target container 190.

On the contrary, if the control circuit 480 determines that the temperature of the target material does not reach the predetermined temperature, the control circuit 480 would determine that the quality of a portion or all of the target material inside the material dispensing device 400 is unacceptable. In this situation, the control circuit 480 deems a portion or all of the target material inside the material dispensing device 400 as unqualified target material, and controls the flow direction switch device 460 to block the first output terminal and to guide the target material inside the material dispensing device 400 to flow toward the material drainage port 404 through the second output terminal, so that the unqualified target material can be discharged to outside the fluid material dispensing apparatus 100 through the material drainage port 404. In this way, the material dispensing device 400 can prevent the target nozzle 150 from dispensing unqualified target material, whose quality may be deteriorated, into the target container 190.

On the other hand, the control circuit 480 controls the pump 110 to operate to extract target material from the corresponding material container 180, so that newly extracted target material will be transported from the outlet connector 182 toward the flow direction switch device 460 through the material transmission channel. With the continuous operation of the pump 110, the unqualified target material inside the material dispensing device 400 will be pushed to flow forward and gradually discharged to outside the fluid material dispensing apparatus 100 through the flow direction switch device 460 and the material drainage port 404, while the newly extracted target material will enter and gradually fill the material transmission channel between the outlet connector 182 and the flow direction switch device 460.

Afterwards, when the control circuit 480 determines that the temperature of the target material reaches the predetermined temperature, it indicates that the unqualified target material inside the material dispensing device 400 has been substantially discharged to outside the fluid material dispensing apparatus 100, and the fluid material currently inside the material dispensing device 400 is the newly extracted target material.

In this situation, the control circuit 480 of this embodiment would determine that the quality of the target material currently inside the material dispensing device 400 is acceptable. Therefore, the control circuit 480 would deem the target material currently inside the material dispensing device 400 as qualified target material, and would control the flow direction switch device 460 to switch its material output direction. Specifically, the control circuit 480 would control the flow direction switch device 460 to guide the target material to flow toward the target nozzle 150 through the first output terminal, so that the target nozzle 150 dispenses qualified target material (i.e., the newly extracted target material) into the target container 190.

For example, as described previously, appropriate refrigeration equipment may be installed within the fluid material dispensing apparatus 100, so that the fluid materials stored in some material containers 180 can be preserved in a low temperature environment. Therefore, fluid materials newly extracted from these material containers 182 should be at a low temperature.

In this case, when the fluid material dispensing apparatus 100 requires the material dispensing device 400 to add a specific low-temperature fluid material to the target container 190, the control circuit 480 utilizes the temperature sensor 470 to sense the temperature of the fluid material inside the material dispensing device 400, evaluates the quality of the fluid material inside the material dispensing device 400 based on the sensing result of the temperature sensor 470, and controls the operation of the flow direction switch device 460 (e.g., the material output direction of the flow direction switch device 460) according to the quality evaluation of the fluid material inside the material dispensing device 400.

If the sensing result of the temperature sensor 470 indicates that the temperature of the fluid material inside the material dispensing device 400 is higher than a first predetermined temperature, which is equal to a reasonable temperature of the low-temperature fluid material or slightly higher than the reasonable temperature by a certain degree, it is likely that the low-temperature fluid material has stayed inside the material dispensing device 400 for too long and thus cause its temperature to increase. In this situation, the quality of a portion or all of the fluid material inside the material dispensing device 400 may deteriorate, which means that the fluid material inside the material dispensing device 400 may lose freshness, have an inappropriate temperature, have insufficient carbonation, have insufficient alcohol content, have insufficient vinegar content, or may experience spoilage.

Accordingly, when the material dispensing device 400 needs to output the low-temperature fluid material to the target container 190, if the control circuit 480 determines that the temperature of the fluid material inside the material dispensing device 400 does not reach the first predetermined temperature (i.e., the temperature of the fluid material is too high in this case), the control circuit 480 controls the flow direction switch device 460 to block the first output terminal and to guide the fluid material inside the material dispensing device 400 to flow toward the material drainage port 404 through the second output terminal, in order to prevent the target nozzle 150 from dispensing fluid material, whose quality may be deteriorated, into the target container 190. On the other hand, the control circuit 480 controls the pump 110 to operate to extract fresh low-temperature fluid material from the corresponding material container 180, so that newly extracted low-temperature fluid material will be transported from the outlet connector 182 toward the flow direction switch device 460 through the material transmission channel. With the continuous operation of the pump 110, the unqualified fluid material inside the material dispensing device 400 will be pushed to flow forward and gradually discharged to outside the fluid material dispensing apparatus 100 through the flow direction switch device 460 and the material drainage port 404, while the newly extracted low-temperature fluid material will enter and gradually fill the material transmission channel between the outlet connector 182 and the flow direction switch device 460.

Afterwards, when the control circuit 480 determines that the temperature of the fluid material inside the material dispensing device 400 reaches the first predetermined temperature, the control circuit 480 controls the flow direction switch device 460 to guide the low-temperature fluid material inside the material dispensing device 400 to flow toward the target nozzle 150 through the first output terminal, so that the target nozzle 150 can dispense low-temperature fluid material, whose quality is acceptable, into the target container 190.

For another example, when the fluid material dispensing apparatus 100 requires the material dispensing device 400 to add a specific high-temperature fluid material to the target container 190, the control circuit 480 utilizes the temperature sensor 470 to sense the temperature of the fluid material inside the material dispensing device 400, evaluates the quality of the fluid material inside the material dispensing device 400 based on the sensing result of the temperature sensor 470, and controls the operation of the flow direction switch device 460 (e.g., the material output direction of the flow direction switch device 460) according to the quality evaluation of the fluid material inside the material dispensing device 400.

If the sensing result of the temperature sensor 470 indicates that the temperature of the fluid material inside the material dispensing device 400 is lower than a second predetermined temperature, which is equal to a reasonable temperature of the high-temperature fluid material or slightly lower than the reasonable temperature by a certain degree, it is likely that the high-temperature fluid material has stayed inside the material dispensing device 400 for too long and thus cause its temperature to drop. In this situation, the quality of a portion or all of the fluid material inside the material dispensing device 400 may deteriorate, which means that the fluid material inside the material dispensing device 400 may lose freshness, have an inappropriate temperature, have insufficient carbonation, have insufficient alcohol content, have insufficient vinegar content, or may experience spoilage.

Accordingly, when the material dispensing device 400 needs to output the high-temperature fluid material to the target container 190, if the control circuit 480 determines that the temperature of the fluid material inside the material dispensing device 400 does not reach the second predetermined temperature (i.e., the temperature of the fluid material is too low in this case), the control circuit 480 controls the flow direction switch device 460 to block the first output terminal and to guide the fluid material inside the material dispensing device 400 to flow toward the material drainage port 404 through the second output terminal, in order to prevent the target nozzle 150 from dispensing fluid material, whose quality may be deteriorated, into the target container 190. On the other hand, the control circuit 480 controls the pump 110 to operate to extract fresh fluid material from the corresponding material container 180, so that newly extracted fluid material will be transported from the outlet connector 182 toward the flow direction switch device 460 through the material transmission channel. With the continuous operation of the pump 110, the unqualified fluid material inside the material dispensing device 400 will be pushed to flow forward and gradually discharged to outside the fluid material dispensing apparatus 100 through the flow direction switch device 460 and the material drainage port 404, while the newly extracted fluid material will enter and gradually fill the material transmission channel between the outlet connector 182 and the flow direction switch device 460. In operations, the material dispensing device 400 may utilize various heating mechanisms to heat the newly extracted fluid material inside the material dispensing device 400 to the second predetermined temperature.

Afterwards, when the control circuit 480 determines that the temperature of the fluid material inside the material dispensing device 400 reaches the second predetermined temperature, the control circuit 480 controls the flow direction switch device 460 to guide the high-temperature fluid material inside the material dispensing device 400 to flow toward the target nozzle 150 through the first output terminal, so that the target nozzle 150 can dispense high-temperature fluid material, whose quality if acceptable, into the target container 190.

Please note that the component structure and connections between components of the material dispensing device 400 in the aforementioned FIG. 4 is merely an exemplary embodiment, rather than a restriction to the practical implementations of the material dispensing device 400.

For example, some different embodiments of the material dispensing device 400 are shown in FIG. 5 through FIG. 9.

Figure 5:
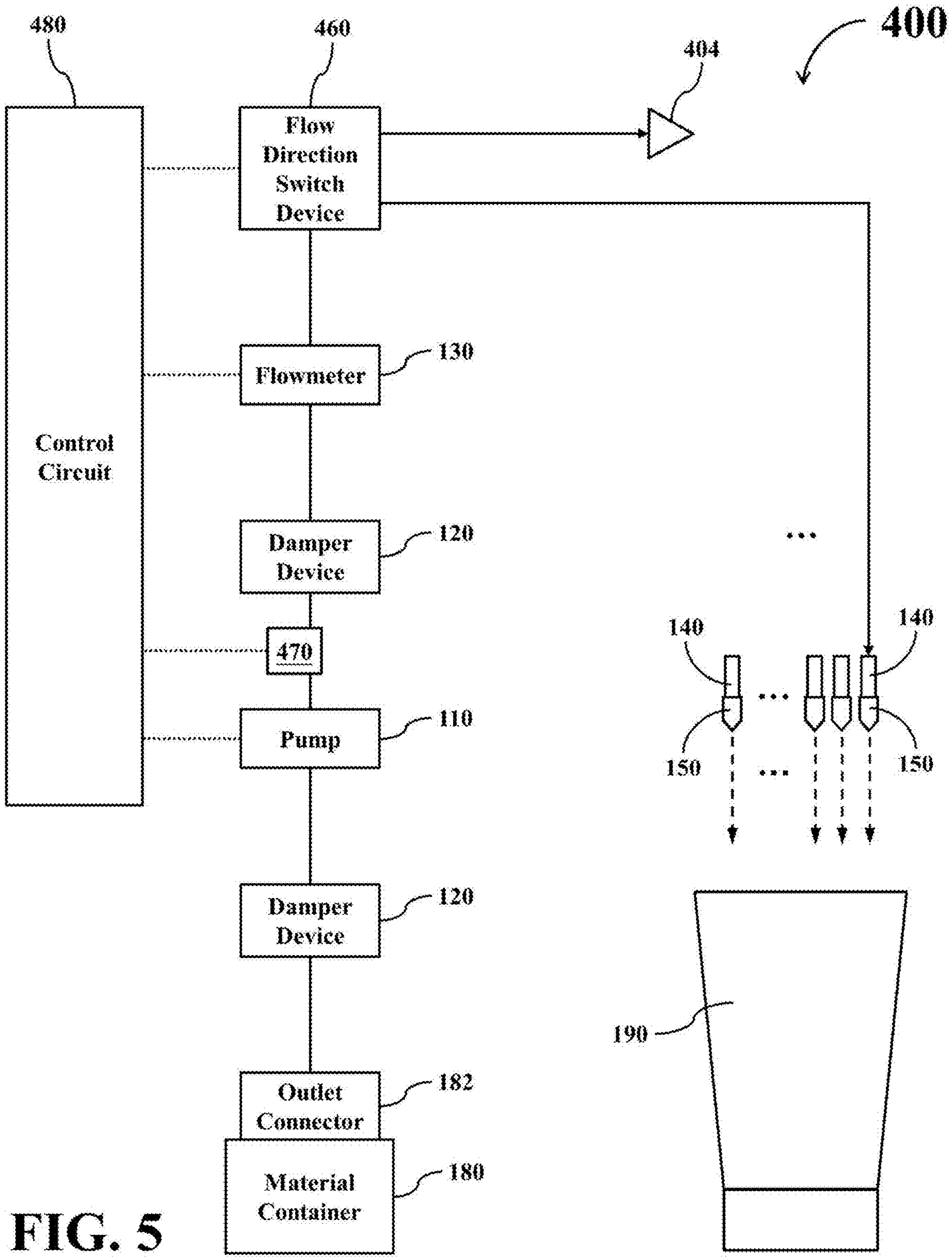
FIG. 5 shows a simplified functional block diagram of a material dispensing device of FIG. 1 according to a second embodiment of the present disclosure.

In the embodiment of FIG. 5, a damper device 120 is coupled between the output of the pump 110 and the input terminal of the flow direction switch device 460. The temperature sensor 470 of this embodiment is positioned between the output of the pump 110 and the input terminal of the damper device 120, and arranged to operably sense the temperature of the target material transmitted from the pump 110 to the damper device 120.

Figure 6:
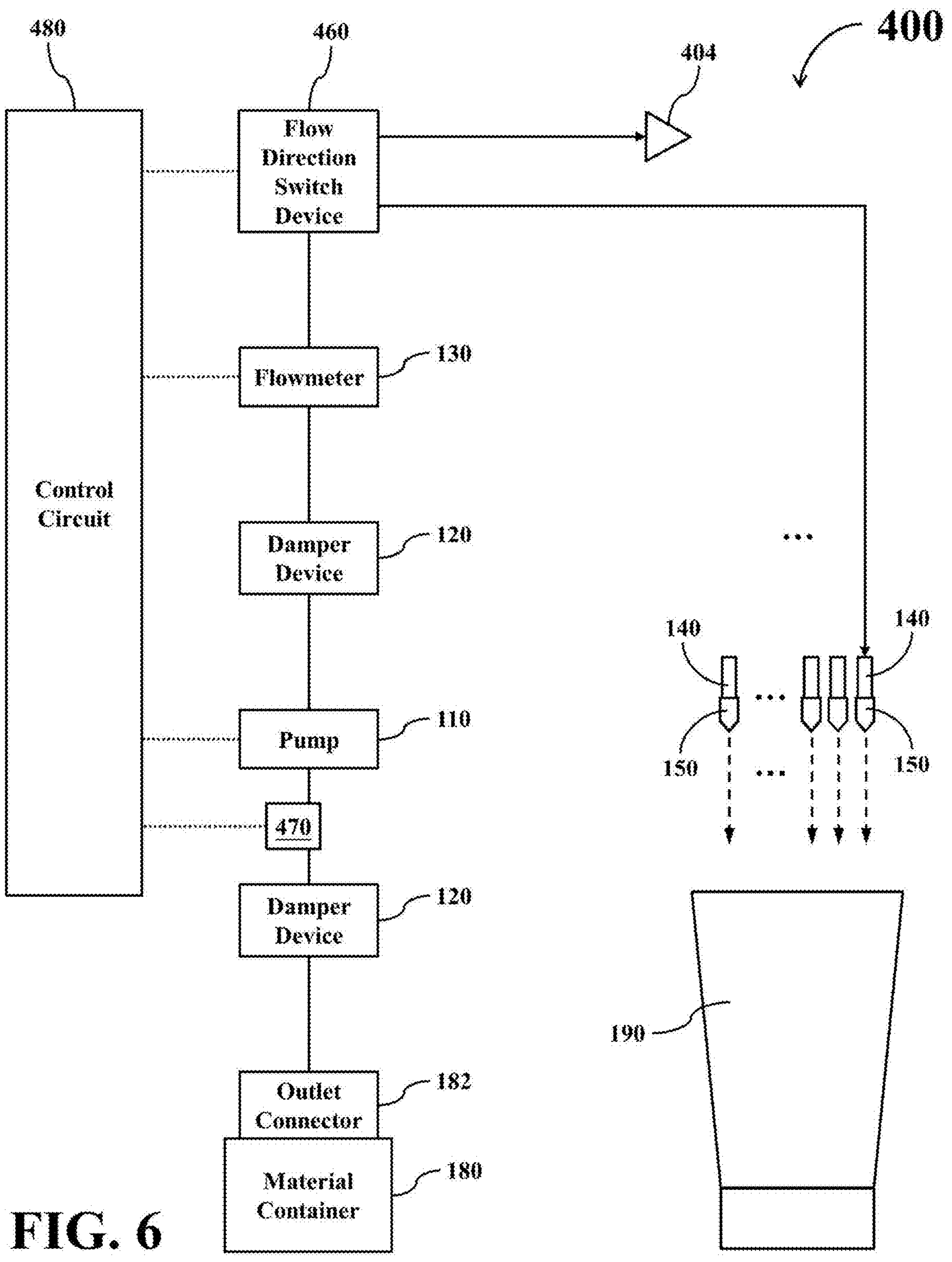
FIG. 6 shows a simplified functional block diagram of a material dispensing device of FIG. 1 according to a third embodiment of the present disclosure.

In the embodiment of FIG. 6, a damper device 120 is coupled between the outlet connector 182 and the input of the pump 110. The temperature sensor 470 of this embodiment is positioned between the output terminal of the damper device 120 and the input of the pump 110, and arranged to operably sense the temperature of the target material transmitted from the damper device 120 to the pump 110.

Figure 7:
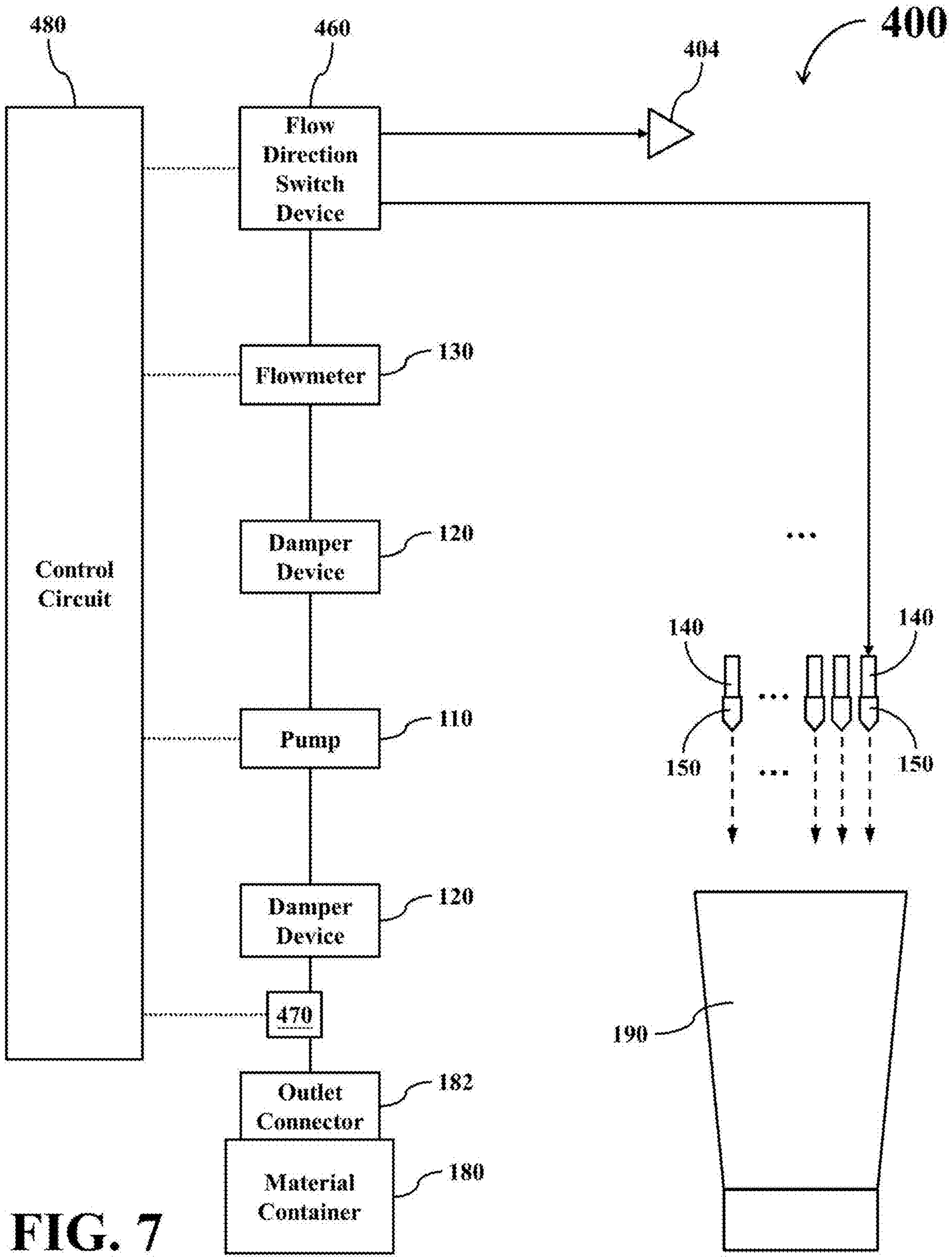
FIG. 7 shows a simplified functional block diagram of a material dispensing device of FIG. 1 according to a fourth embodiment of the present disclosure.

In the embodiment of FIG. 7, a damper device 120 is coupled between the outlet connector 182 and the input of the pump 110. The temperature sensor 470 of this embodiment is positioned between the outlet connector 182 and the input terminal of the damper device 120, and arranged to operably sense the temperature of the target material transmitted from the outlet connector 182 to the damper device 120.

Figure 8:
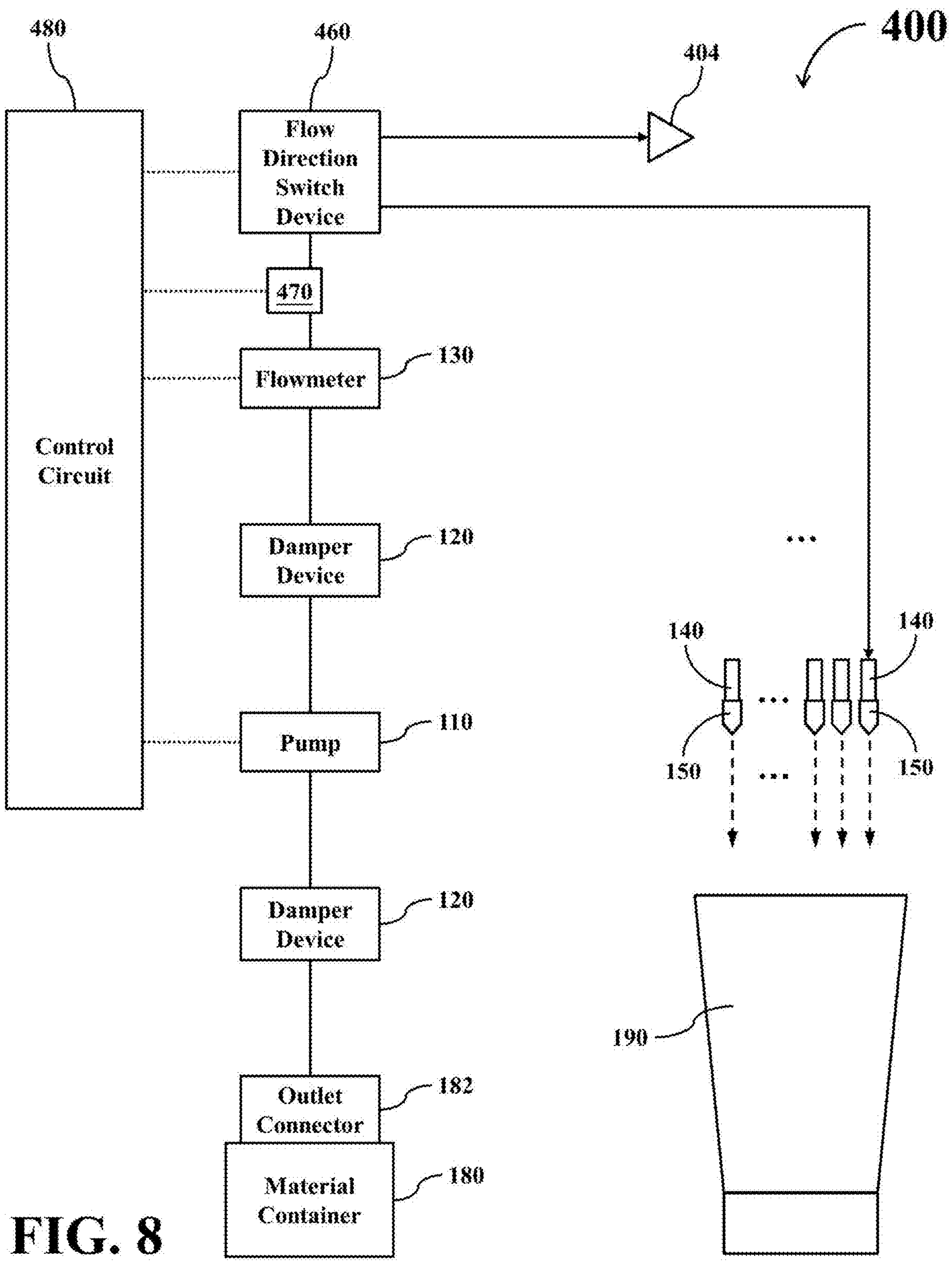
FIG. 8 shows a simplified functional block diagram of a material dispensing device of FIG. 1 according to a fifth embodiment of the present disclosure.

In the embodiment of FIG. 8, the flowmeter 130 is coupled between the damper device 120 and the input terminal of the flow direction switch device 460. The temperature sensor 470 of this embodiment is positioned between the flowmeter 130 and the flow direction switch device 460, and arranged to operably sense the temperature of the target material transmitted from the flowmeter 130 to the flow direction switch device 460.

Figure 9:
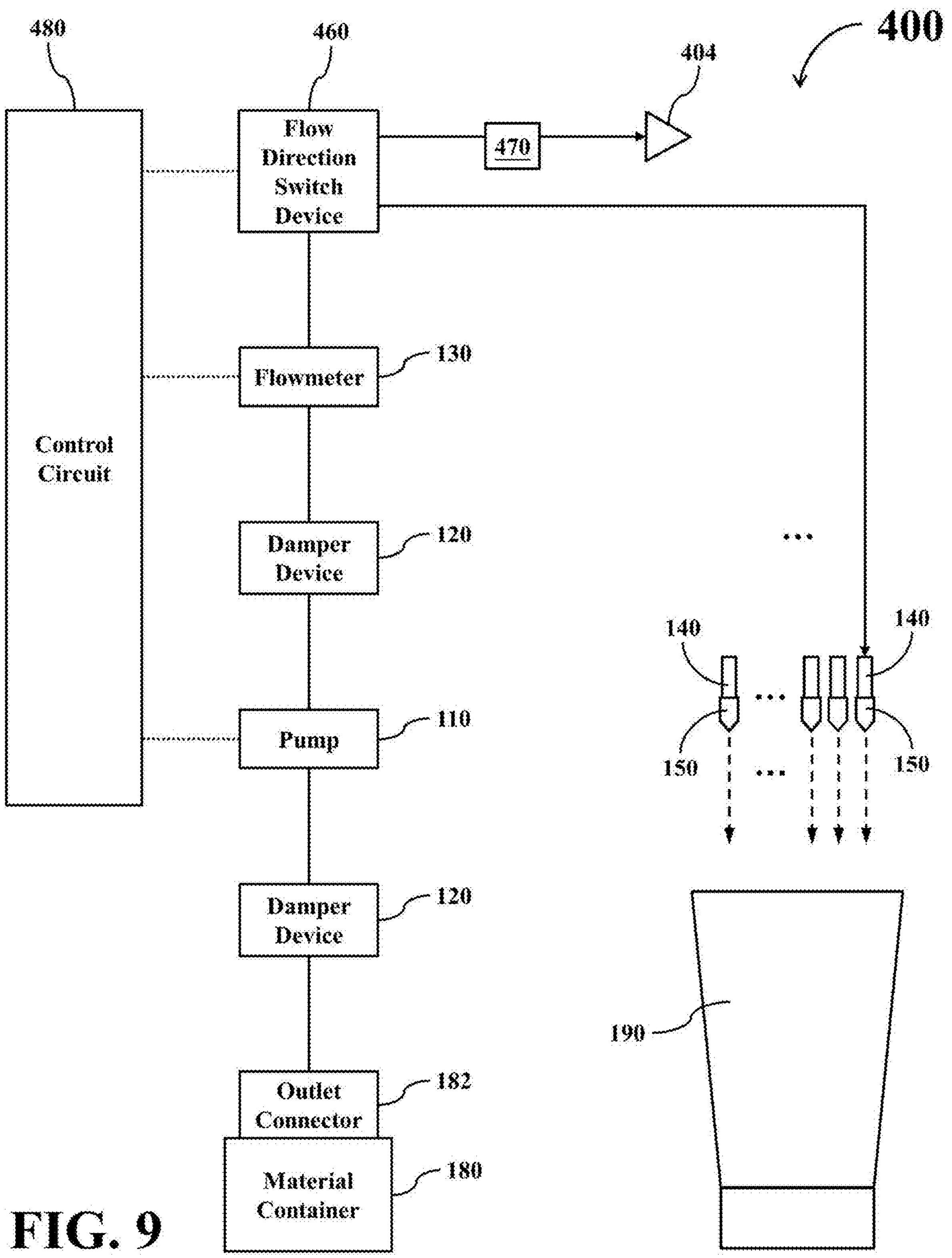
FIG. 9 shows a simplified functional block diagram of a material dispensing device of FIG. 1 according to a sixth embodiment of the present disclosure.

In the embodiment of FIG. 9, the temperature sensor 470 is positioned between the second output terminal of the flow direction switch device 460 and the material drainage port 404, and arranged to operably sense the temperature of the target material transmitted from the second output terminal of the flow direction switch device 460 to the material drainage port 404.

The foregoing descriptions regarding the implementations, connections, operations, and related advantages of other corresponding functional blocks of the material dispensing device 400 of FIG. 4 are also applicable to the embodiments in FIG. 5 through FIG. 9. For the sake of brevity, those descriptions will not be repeated here.

In some embodiments, the material dispensing device 400 may adopt other mechanisms to evaluate the quality of the target material inside the material dispensing device 400 without using any temperature sensor.

Figure 10:
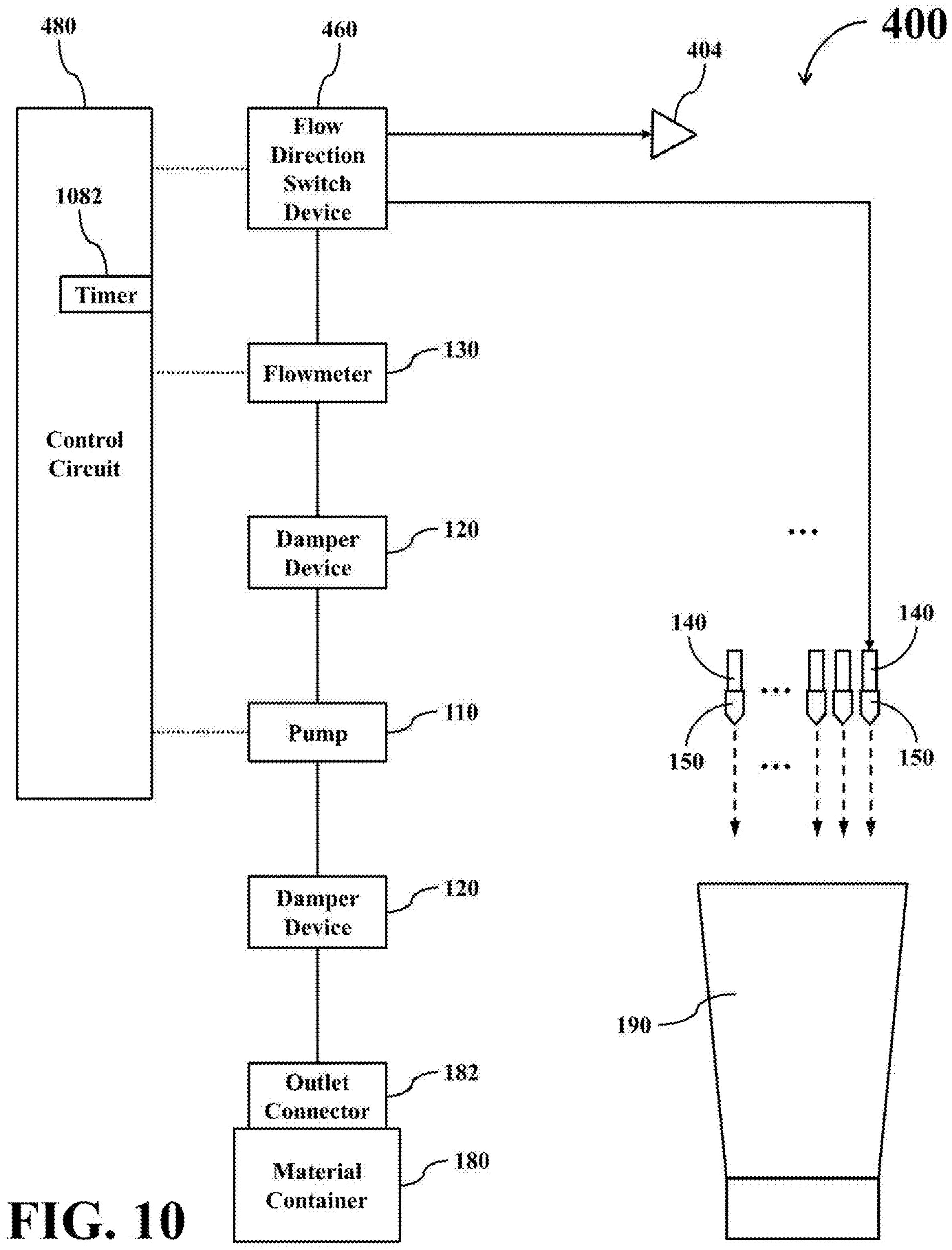
FIG. 10 shows a simplified functional block diagram of a material dispensing device of FIG. 1 according to a seventh embodiment of the present disclosure.

For example, FIG. 10 shows a simplified functional block diagram of the material dispensing device 400 according to another embodiment of the present disclosure. In the material dispensing device 400 of FIG. 10, the temperature sensor 470 described previously is omitted. Instead, as shown in FIG. 10, the control circuit 480 of the material dispensing device 400 further comprises a timer 1082.

The timer 1082 is arranged to operably record a duration of time for operation of a particular component of the material dispensing device 400, and to operably generate a corresponding time-length value. In practice, the timer 1082 may be realized with a physical circuit of the control circuit 480 or may be realized with any appropriate computer program executed by the control circuit 480.

For example, the timer 1082 may record a duration of time for the operation of the pump 110 to generate a corresponding time-length value.

For another example, the timer 1082 may record a duration of time for the flowmeter 130 outputting the target material to generate a corresponding time-length value.

For yet another example, the timer 1082 may record a duration of time for the flow direction switch device 460 outputting the target material to the material drainage port 404 to generate a corresponding time-length value.

When the fluid material dispensing apparatus 100 requires the material dispensing device 400 to add target material to the target container 190, the control circuit 480 presumes that the quality of a portion or all of the fluid material currently inside the material dispensing device 400 is unacceptable, and deems a portion or all of the fluid material currently inside the material dispensing device 400 as unqualified material. In this situation, the control circuit 480 controls the flow direction switch device 460 to block the first output terminal and to guide the target material inside the material dispensing device 400 to flow toward the material drainage port 404 through the second output terminal, so that the unqualified target material can be discharged to outside the fluid material dispensing apparatus 100 through the material drainage port 404. In this way, the material dispensing device 400 can prevent the target nozzle 150 from dispensing target material, whose quality may be deteriorated, into the target container 190.

On the other hand, the control circuit 480 controls the pump 110 to operate to extract target material from the corresponding material container 180, so that newly extracted target material will be transported from the outlet connector 182 toward the flow direction switch device 460 through the material transmission channel. With the continuous operation of the pump 110, the unqualified target material inside the material dispensing device 400 will be pushed to flow forward and gradually discharged to outside the fluid material dispensing apparatus 100 through the flow direction switch device 460 and the material drainage port 404, while the newly extracted target material will enter and gradually fill the material transmission channel between the outlet connector 182 and the flow direction switch device 460.

In operations, the material dispensing device 400 may need to take a certain time to substantially discharge the unqualified material inside the material dispensing device 400 through the material drainage port 404. The control circuit 480 of this embodiment controls the timer 1082 to operably record a duration of time for operation of a particular component in the period during which the material dispensing device 400 outputs the unqualified material through the material drainage port 404, and to operably generate a corresponding time-length value. The control circuit 480 may estimate the progress of discharging unqualified material according to the time-length value generated by the timer 1082. From another aspect, the control circuit 480 is enabled to evaluate the quality of the target material inside the material dispensing device 400 according to the time-length value generated by the timer 1082.

Specifically, before the time-length value reaches a predetermined value, the control circuit 480 determines that the unqualified material inside the material dispensing device 400 has not been substantially discharged yet, and thus the control circuit 480 determines that the quality of a portion or all of the target material inside the material dispensing device 400 is unacceptable. When the time-length value reaches the predetermined value, the control circuit 480 determines that the unqualified material inside the material dispensing device 400 has been substantially discharged to outside the fluid material dispensing apparatus 100, and thus the control circuit 480 determines that the quality of the target material currently inside the material dispensing device 400 is acceptable. In other words, the control circuit 480 will determine that the quality of a portion or all of the target material inside the material dispensing device 400 is unacceptable until the time-length value reaches the predetermined value.

Before the control circuit 480 determines that the quality of the target material inside the material dispensing device 400 is acceptable (i.e., before the time-length value reaches the predetermined value in this embodiment), the control circuit 480 controls the flow direction switch device 460 to continue blocking the first output terminal and to continue guiding the target material inside the material dispensing device 400 to flow toward the material drainage port 404 through the second output terminal, so that the unqualified target material can be discharged to outside the fluid material dispensing apparatus 100 through the material drainage port 404. As a result, the material dispensing device 400 can prevent the target nozzle 150 from dispensing unqualified target material, whose quality may be deteriorated, into the target container 190.

Afterwards, when the control circuit 480 determines that the quality of the target material currently inside the material dispensing device 400 is acceptable (i.e., when the time-length value reaches the predetermined value in this embodiment), the control circuit 480 controls the flow direction switch device 460 to guide the target material to flow toward the target nozzle 150 through the first output terminal, so that the target nozzle 150 can dispense qualified target material into the target container 190.

The foregoing descriptions regarding the implementations, connections, operations, and related advantages of other corresponding functional blocks of the material dispensing device 400 in FIG. 4 through FIG. 9 are also applicable to the embodiment of FIG. 10. For the sake of brevity, those descriptions will not be repeated here.

In some embodiments, the material dispensing device 400 may adopt other mechanisms to estimate the progress of discharging unqualified material through the material drainage port 404 without using the aforementioned timer 1082.

Figure 11:
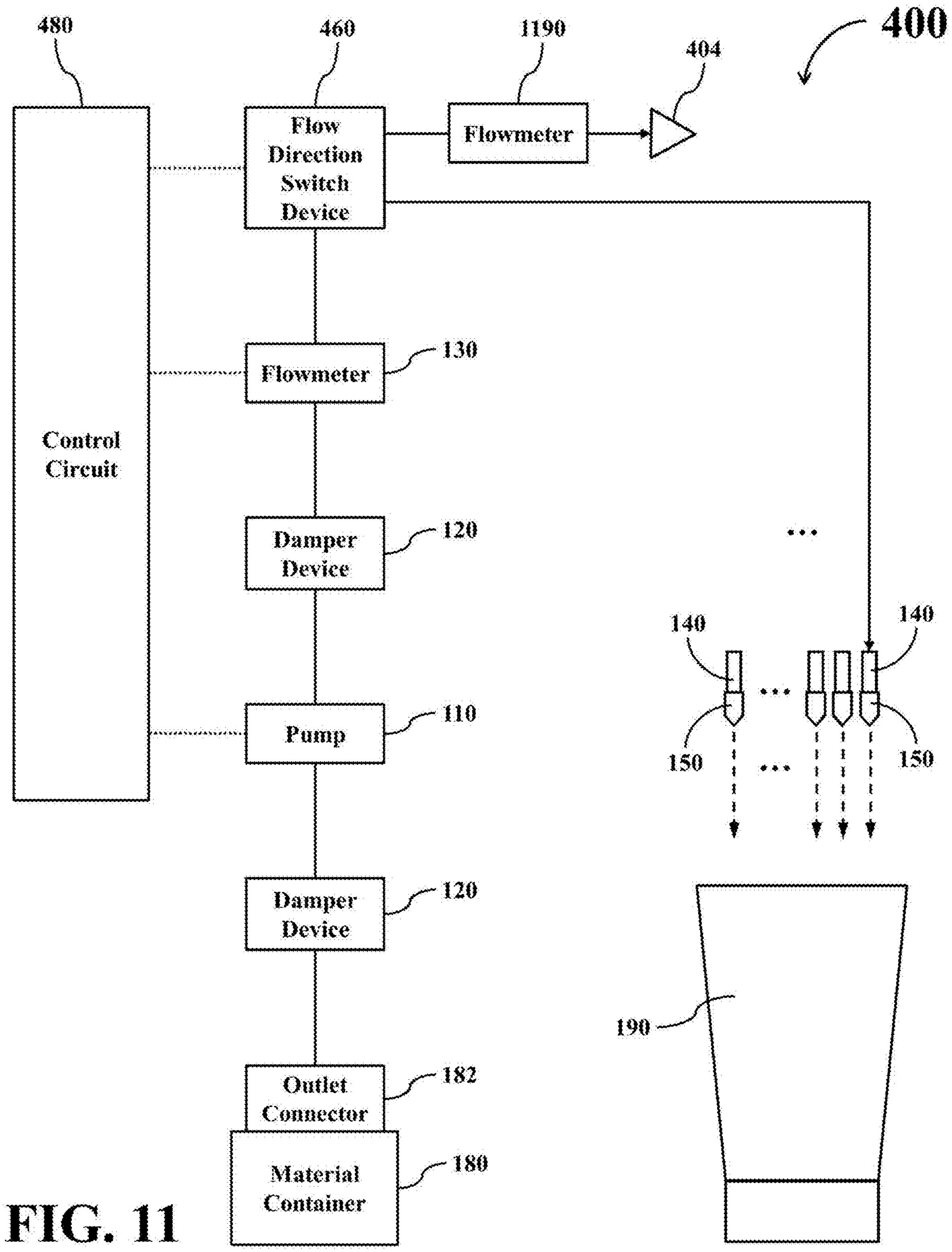
FIG. 11 shows a simplified functional block diagram of a material dispensing device of FIG. 1 according to an eighth embodiment of the present disclosure.
Figure 12:
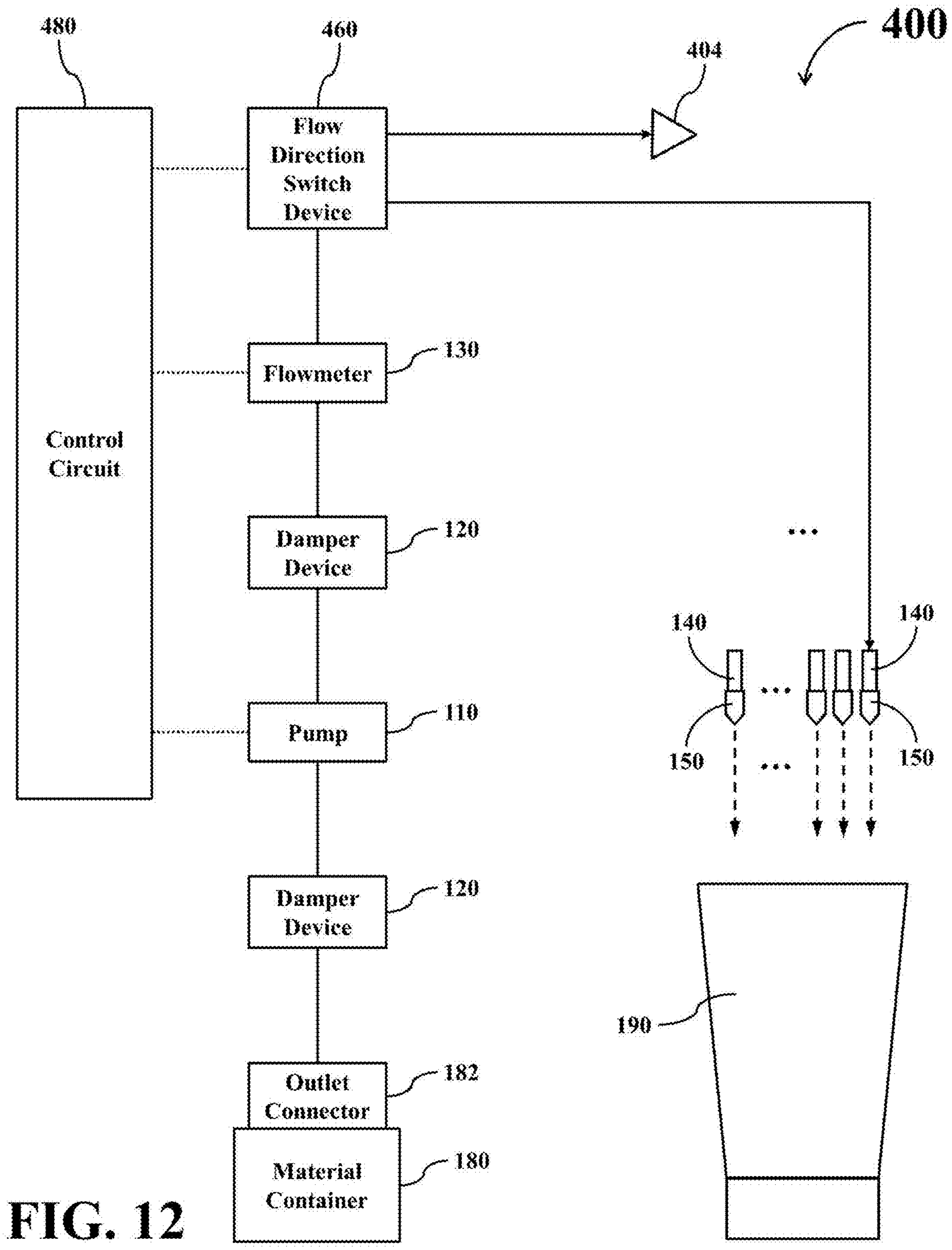
FIG. 12 shows a simplified functional block diagram of a material dispensing device of FIG. 1 according to a ninth embodiment of the present disclosure.

For example, FIG. 11 and FIG. 12 show simplified functional block diagrams of the material dispensing device 400 according to different embodiments of the present disclosure.

In the embodiment of FIG. 11, the material dispensing device 400 further comprises a flowmeter 1190. The flowmeter 1190 is coupled with the control circuit 480, and coupled between the second output terminal of the flow direction switch device 460 and the material drainage port 404, and arranged to operably measure a flow of the target material transmitted from the flow direction switch device 460 to the material drainage port 404 to generate a measurement value.

When the fluid material dispensing apparatus 100 requires the material dispensing device 400 to add target material to the target container 190, the control circuit 480 presumes that the quality of a portion or all of the fluid material currently inside the material dispensing device 400 is unacceptable and deems a portion or all of the fluid material currently inside the material dispensing device 400 as unqualified material. In this situation, the control circuit 480 controls the flow direction switch device 460 to block the first output terminal and to guide the target material inside the material dispensing device 400 to flow toward the material drainage port 404 through the second output terminal, so that the unqualified target material can be discharged to outside the fluid material dispensing apparatus 100 through the material drainage port 404. In this way, the material dispensing device 400 can prevent the target nozzle 150 from dispensing target material, whose quality may be deteriorated, into the target container 190.

On the other hand, the control circuit 480 controls the pump 110 to operate to extract target material from the corresponding material container 180, so that newly extracted target material will be transported from the outlet connector 182 toward the flow direction switch device 460 through the material transmission channel. With the continuous operation of the pump 110, the unqualified target material inside the material dispensing device 400 will be pushed to flow forward and gradually discharged to outside the fluid material dispensing apparatus 100 through the flow direction switch device 460 and the material drainage port 404, while the newly extracted target material will enter and gradually fill the material transmission channel between the outlet connector 182 and the flow direction switch device 460.

In operations, the material dispensing device 400 may need to take a certain time to substantially discharge the unqualified material inside the material dispensing device 400 through the material drainage port 404. The control circuit 480 of this embodiment controls the flowmeter 1190 to operably measure a flow of the target material transmitted from the flow direction switch device 460 to the material drainage port 404 to generate a measurement value. The control circuit 480 may estimate the progress of discharging unqualified material according to the measurement value generated by the flowmeter 1190. From another aspect, the control circuit 480 is enabled to evaluate the quality of the target material inside the material dispensing device 400 according to the measurement value generated by the flowmeter 1190.

Specifically, before the measurement value reaches a predetermined threshold, the control circuit 480 determines that the unqualified material inside the material dispensing device 400 has not been substantially discharged yet, and thus the control circuit 480 determines that the quality of a portion or all of the target material inside the material dispensing device 400 is unacceptable. When the measurement value reaches the predetermined threshold, the control circuit 480 determines that the unqualified material inside the material dispensing device 400 has been substantially discharged to outside the fluid material dispensing apparatus 100, and thus the control circuit 480 determines that the quality of the target material currently inside the material dispensing device 400 is acceptable. In other words, the control circuit 480 will determine that the quality of a portion or all of the target material inside the material dispensing device 400 is unacceptable until the measurement value reaches the predetermined threshold.

Before the control circuit 480 determines that the quality of the target material inside the material dispensing device 400 is acceptable (i.e., before the measurement value reaches the predetermined threshold in this embodiment), the control circuit 480 controls the flow direction switch device 460 to continue blocking the first output terminal and to continue guiding the target material inside the material dispensing device 400 to flow toward the material drainage port 404 through the second output terminal, so that the unqualified target material can be discharged to outside the fluid material dispensing apparatus 100 through the material drainage port 404. As a result, the material dispensing device 400 can prevent the target nozzle 150 from dispensing unqualified target material, whose quality may be deteriorated, into the target container 190.

Afterwards, when the control circuit 480 determines that the quality of the target material currently inside the material dispensing device 400 is acceptable (i.e., when the measurement value reaches the predetermined threshold in this embodiment), the control circuit 480 controls the flow direction switch device 460 to guide the target material to flow toward the target nozzle 150 through the first output terminal, so that the target nozzle 150 can dispense qualified target material into the target container 190.

The foregoing descriptions regarding the implementations, connections, operations, and related advantages of other corresponding functional blocks of the material dispensing device 400 in FIG. 4 through FIG. 10 are also applicable to the embodiment of FIG. 11. For the sake of brevity, those descriptions will not be repeated here.

It can be appreciated form the foregoing descriptions that the material dispensing device 400 of FIG. 11 does not need to utilize any temperature sensor to sense the temperature of the target material, nor does it need to utilize any timer to estimate the progress of discharging unqualified material through the material drainage port 404.

FIG. 12 shows another embodiment of the material dispensing device 400. The material dispensing device 400 of FIG. 12 is similar to the material dispensing device 400 of FIG. 11. However, the arrangement and role of the flowmeter 130 of FIG. 12 are different from the flowmeter 130 of FIG. 11.

As described previously, the flowmeter 130 may be arranged at any appropriate position between the outlet connector 182 and the nozzle 150. For example, in the embodiment of FIG. 12, the flowmeter 130 is coupled between the damper 120 and the input terminal of the flow direction switch device 460, and arranged to operably measure a flow of target material to be dispensed to the target container 190.

In another aspect, the flowmeter 130 of FIG. 12 can be utilized to measure a flow of the target material to be transmitted to the flow direction switch device 460 to generate a measurement value, which is corresponding to the flow of the target material to be outputted from the flow direction switch device 460 to the material drainage port 404.

In the embodiment of FIG. 12, when the fluid material dispensing apparatus 100 requires the material dispensing device 400 to add target material to the target container 190, the control circuit 480 presumes that the quality of a portion or all of the fluid material currently inside the material dispensing device 400 is unacceptable and deems a portion or all of the fluid material currently inside the material dispensing device 400 as unqualified material. In this situation, the control circuit 480 controls the flow direction switch device 460 to block the first output terminal and to guide the target material inside the material dispensing device 400 to flow toward the material drainage port 404 through the second output terminal, so that the unqualified target material can be discharged to outside the fluid material dispensing apparatus 100 through the material drainage port 404. In this way, the material dispensing device 400 can prevent the target nozzle 150 from dispensing target material, whose quality may be deteriorated, into the target container 190.

On the other hand, the control circuit 480 controls the pump 110 to operate to extract target material from the corresponding material container 180, so that newly extracted target material will be transported from the outlet connector 182 toward the flow direction switch device 460 through the material transmission channel. With the continuous operation of the pump 110, the unqualified target material inside the material dispensing device 400 will be pushed to flow forward and gradually discharged to outside the fluid material dispensing apparatus 100 through the flow direction switch device 460 and the material drainage port 404, while the newly extracted target material will enter and gradually fill the material transmission channel between the outlet connector 182 and the flow direction switch device 460.

In operations, the material dispensing device 400 may need to take a certain time to substantially discharge the unqualified material inside the material dispensing device 400 through the material drainage port 404. The control circuit 480 of this embodiment controls the flowmeter 130 to operably measure a flow of the target material to be transmitted to the flow direction switch device 460 to generate a measurement value. The control circuit 480 may estimate the progress of discharging unqualified material according to the measurement value generated by the flowmeter 130. From another aspect, the control circuit 480 is enabled to evaluate the quality of the target material inside the material dispensing device 400 according to the measurement value generated by the flowmeter 130.

Specifically, before the measurement value reaches a predetermined threshold, the control circuit 480 determines that the unqualified material inside the material dispensing device 400 has not been substantially discharged yet, and thus the control circuit 480 determines that the quality of a portion or all of the target material inside the material dispensing device 400 is unacceptable. When the measurement value reaches the predetermined threshold, the control circuit 480 determines that the unqualified material inside the material dispensing device 400 has been substantially discharged to outside the fluid material dispensing apparatus 100, and thus the control circuit 480 determines that the quality of the target material currently inside the material dispensing device 400 is acceptable. In other words, the control circuit 480 will determine that the quality of a portion or all of the target material inside the material dispensing device 400 is unacceptable until the measurement value reaches the predetermined threshold.

Before the control circuit 480 determines that the quality of the target material inside the material dispensing device 400 is acceptable (i.e., before the measurement value reaches the predetermined threshold in this embodiment), the control circuit 480 controls the flow direction switch device 460 to continue blocking the first output terminal and to continue guiding the target material inside the material dispensing device 400 to flow toward the material drainage port 404 through the second output terminal, so that the unqualified target material can be discharged to outside the fluid material dispensing apparatus 100 through the material drainage port 404. As a result, the material dispensing device 400 can prevent the target nozzle 150 from dispensing unqualified target material, whose quality may be deteriorated, into the target container 190.

Afterwards, when the control circuit 480 determines that the quality of the target material currently inside the material dispensing device 400 is acceptable (i.e., when the measurement value reaches the predetermined threshold in this embodiment), the control circuit 480 controls the flow direction switch device 460 to guide the target material to flow toward the target nozzle 150 through the first output terminal, so that the target nozzle 150 can dispense qualified target material into the target container 190.

The foregoing descriptions regarding the implementations, connections, operations, and related advantages of other corresponding functional blocks of the material dispensing device 400 in FIG. 4 through FIG. 11 are also applicable to the embodiment of FIG. 12. For the sake of brevity, those descriptions will not be repeated here.

It can be appreciated form the foregoing descriptions that the material dispensing device 400 of FIG. 12 does not need to utilize any temperature sensor to sense the temperature of the target material, nor does it need to utilize any timer to estimate the progress of discharging unqualified material through the material drainage port 404.

In some embodiments where the fluid material dispensing apparatus 100 is utilized as an automated beverage preparation apparatus, a user may place a target container 190 on an appropriate position beneath the aforementioned multiple nozzles 150 and manipulate the control panel 109 to configure one or more production parameters for the required freshly made beverages, such as beverage item, cup size, beverage volume, sugar level, ice level, and/or quantity of cups, or the like.

Then, the material dispensing devices 400 of the fluid material dispensing apparatus 100 would automatically discharge some fluid materials, whose quality may be deteriorated, through the material drainage port 404, and operate based on the parameters configured by the user to automatically utilize one or more pumps 110 to extract the fluid materials from one or more material containers 180, and to transmit the extracted fluid materials toward corresponding nozzles 150 through respective transmission pipes. With the continuous operation of the respective pump, qualified fluid materials will be dispensed to the target container 190 through corresponding nozzles 150.

Freshly made beverages of a variety of flavors can be obtained by mixing different fluid materials together in the target container 190 according to a particular ratio, or by simple stirring after mixing the fluid materials. In practice, the target container 190 may be designed to support or have a blending functionality to increase the speed and uniformity of mixing the fluid materials.

In the embodiment where the fluid material dispensing apparatus 100 is utilized as a sauce dispensing apparatus, the user may place the target container 190 on an appropriate position beneath the aforementioned multiple nozzles 150 and manipulate the control panel 109 to configure species and output amount of related sauce to be dispensed.

Similarly, the material dispensing devices 400 of the fluid material dispensing apparatus 100 would automatically discharge some fluid materials, whose quality may be deteriorated, through the material drainage port 404, and operate based on the parameters configured by the user to automatically utilizes one or more pumps 110 to extract the fluid materials from one or more material containers 180, and to transmit the extracted fluid materials toward corresponding nozzles 150 through respective transmission pipes. With the continuous operation of the respective pump, the fluid material dispensing apparatus 100 is enabled to output a specific amount of one or more sauces of an acceptable quality to the target container 190 through corresponding nozzle 150.

Accordingly, the disclosed fluid material dispensing apparatus 100 is capable of accurately controlling the material output volume of respective fluid materials, and thus it is enabled to maintain the taste consistency of resulting freshly made beverages.

In addition, the material dispensing device 400 automatically discards unqualified materials to exclude unqualified materials when making beverages. As a result, the material dispensing device 400 can prevent the nozzles 150 from dispensing unqualified target materials, whose quality may be deteriorated, into the target container 190.

From another perspective, the fluid material dispensing apparatus 100 is enabled to ensure that the quality and freshness of the resulting beverages meets requirements.

Furthermore, the disclosed fluid material dispensing apparatus 100 is enabled to operate based on the parameters configured by the user to automatically utilize multiple material dispensing devices 400 to output extracted fluid materials to the target container 190 through corresponding nozzles 150, so as to achieve the automatic preparation of freshly made beverages. Therefore, the disclosed fluid material dispensing apparatus 100 not only effectively reduces the time and cost required for personnel training, but also significantly reduces the labor time required for the preparation of the freshly made beverages.

Please note that the component structure and connections between components of the fluid material dispensing apparatus 100 in the aforementioned FIG. 4 through FIG. 21 are merely exemplary embodiments, rather than a restriction to the practical implementations of the fluid material dispensing apparatus 100.

For example, the flow direction switch device 460 may be instead arranged between the outlet connector 182 and the damper device 120.

For another example, the flow direction switch device 460 may be instead arranged between the outlet connector 182 and the pump 110.

For another example, the flow direction switch device 460 may be instead arranged between the damper device 120 and the pump 110.

For another example, the flow direction switch device 460 may be instead arranged between the damper device 120 and the flowmeter 130.

For another example, in some embodiments, the flowmeter 130 may be omitted, and the material dispensing device 400 may utilize other approaches to measure the amount of fluid material to be dispensed to the target container 190. In one embodiment, the material dispensing device 400 may utilize a timer to operably record a duration of time for operation of a particular component (e.g., the pump 110 or the damper device 120), and to operably generate a corresponding time-length value. The control circuit 480 of the material dispensing device 400 may estimate the output amount of the fluid material according to the time-length value generated by the timer. In another embodiment, the material dispensing device 400 may utilize a weight scale to measure changes in the weight of the target container 190, and the control circuit 480 of the material dispensing device 400 may calculate the output amount of the fluid material based on the measurement results of the weight scale.

Certain terms are used throughout the description and the claims to refer to particular components. One skilled in the art appreciates that a component may be referred to by different names. This disclosure does not intend to distinguish between components that differ in name but not in function. In the description and in the claims, the term "comprise" is used in an open-ended fashion, and thus should be interpreted to mean "include, but not limited to." The term "couple" is intended to encompass any indirect or direct connection. For example, if this disclosure mentioned that a first circuit is coupled with a second circuit, it means that the first circuit may be directly or indirectly connected to the second circuit through electrical connections, wireless communications, optical communications, or other signal connections with/without other intermediate devices or connection means.

The term "and/or" may comprise any and all combinations of one or more of the associated listed items. In addition, the singular forms "a," "an," and "the" herein are intended to comprise the plural forms as well, unless the context clearly indicates otherwise.

Throughout the description and claims, the term "element" contains the concept of component, layer, or region.

In the drawings, the size and relative sizes of some elements may be exaggerated or simplified for clarity. Accordingly, unless the context clearly specifies, the shape, size, relative size, and relative position of each element in the drawings are illustrated merely for clarity, and not intended to be used to restrict the claim scope.

For the purpose of explanatory convenience in the specification, spatially relative terms, such as "on," "above," "below," "beneath," "higher," "lower," "upward," "downward," "forward," "backward," and the like, may be used herein to describe the function of a particular element or to describe the relationship of one element to other element(s) as illustrated in the drawings. It will be understood that the spatially relative terms are intended to encompass different orientations of the element in use, in operations, or in assembly in addition to the orientation depicted in the drawings. For example, if the element in the drawings is turned over, elements described as "on" or "above" other elements would then be oriented "under" or "beneath" the other elements. Thus, the exemplary term "beneath" can encompass both an orientation of above and beneath. For another example, if the element in the drawings is reversed, the action described as "forward" may become "backward," and the action described as "backward" may become "forward." Thus, the exemplary description "forward" can encompass both an orientation of forward and backward.

Throughout the description and claims, it will be understood that when an element is referred to as being "positioned on," "positioned above," "connected to," "engaged with," or "coupled with" another element, it can be directly on, directly connected to, or directly engaged with the other element, or intervening element may be present. In contrast, when an element is referred to as being "directly on," "directly connected to," or "directly engaged with" another element, there are no intervening elements present.

Other embodiments of the invention will be apparent to those skilled in the art from consideration of the specification and practice of the invention disclosed herein. It is intended that the specification and examples be considered as exemplary only, with a true scope and spirit of the invention indicated by the following claims.

What is claimed is:

1. A material dispensing device (400), comprising:

a target nozzle (150), arranged to operably dispense a target material to a target container (190);

a pump (110), coupled between an outlet connector (182) of a material container (180) and the target nozzle (150), and arranged to operably extract the target material from the material container (180) and to operably push the target material to flow toward the target nozzle (150);

a material drainage port (404);

a flow direction switch device (460), comprising:

an input terminal, arranged to operably receive the target material;

a first output terminal, coupled with the target nozzle (150); and a second output terminal, coupled with the material drainage port (404);

a control circuit (480), coupled with the pump (110) and the flow direction switch device (460), and arranged to operably control the pump (110) and the flow direction switch device (460); and one or more temperature sensors (470), coupled with the control circuit (480), and arranged to operably sense and report the temperature of the target material inside the material dispensing device (400) to the control circuit (480);

wherein when the material dispensing device (400) needs to output the target material to the target container (190), the control circuit (480) evaluates quality of the target material inside the material dispensing device (400) based on sensing results of the one or more temperature sensors (470);

wherein if a temperature of the target material inside the material dispensing device (400) does not reach a predetermined temperature, the control circuit (480) determines that quality of a portion or all of the target material inside the material dispensing device (400) is unacceptable, and deems a portion or all of the target material currently inside the material dispensing device (400) as unqualified material, and then the control circuit (480) controls the flow direction switch device (460) to block the first output terminal and to guide the unqualified material to flow toward the material drainage port (404) through the second output terminal, so as to prevent the target nozzle (150) from dispensing the unqualified material into the target container (190), and the control circuit (480) also controls the pump (110) to operate, so that newly extracted target material is transported from the outlet connector (182) toward the flow direction switch device (460);

wherein with continuous operation of the pump (110), the unqualified material inside the material dispensing device (400) can be pushed to flow forward and gradually discharged to outside through the flow direction switch device (460) and the material drainage port (404), while the newly extracted target material enters and gradually fills a material transmission channel between the outlet connector (182) and the flow direction switch device (460);

afterwards, when the temperature of the target material reaches the predetermined temperature, the control circuit (480) determines that the quality of the target material currently inside the material dispensing device (400) is acceptable, and then the control circuit (480) controls the flow direction switch device (460) to guide the target material to flow toward the target nozzle (150) through the first output terminal, so that the target nozzle (150) dispenses the target material having acceptable quality into the target container (190).

2. The material dispensing device (400) of claim 1, wherein the one or more temperature sensors (470) comprise:

a temperature sensor (470), arranged to operably sense the temperature of the target material transmitted from the outlet connector (182) of the material container (180) to the input terminal of the flow direction switch device (460).

3. The material dispensing device (400) of claim 2, further comprising:

a damper device (120), coupled with the pump (110), and arranged to operably buffer the target material flowing through the damper device (120).

4. The material dispensing device (400) of claim 3, further comprising:

a flowmeter (130), coupled between the damper device (120) and the flow direction switch device (460), and arranged to operably measure a flow of the target material transmitted from the damper device (120) to the flow direction switch device (460);

wherein the temperature sensor (470) is arranged to operably sense the temperature of the target material transmitted from the damper device (120) to the flowmeter (130).

5. The material dispensing device (400) of claim 3, wherein the damper device (120) is coupled between an output of the pump (110) and the input terminal of the flow direction switch device (460), and the temperature sensor (470) is arranged to operably sense the temperature of the target material transmitted from the pump (110) to the damper device (120).

6. The material dispensing device (400) of claim 3, wherein the damper device (120) is coupled between the outlet connector (182) and an input of the pump (110), and the temperature sensor (470) is arranged to operably sense the temperature of the target material transmitted from the damper device (120) to the pump (110).

7. The material dispensing device (400) of claim 3, wherein the damper device (120) is coupled between the outlet connector (182) and an input of the pump (110), and the temperature sensor (470) is arranged to operably sense the temperature of the target material transmitted from the outlet connector (182) to the damper device (120).

8. The material dispensing device (400) of claim 3, further comprising:

a flowmeter (130), coupled between the damper device (120) and the flow direction switch device (460), and arranged to operably measure a flow of the target material transmitted from the damper device (120) to the flow direction switch device (460);

wherein the temperature sensor (470) is arranged to operably sense the temperature of the target material transmitted from the flowmeter (130) to the flow direction switch device (460).

9. The material dispensing device (400) of claim 1, wherein the one or more temperature sensors (470) comprise:

a temperature sensor (470), arranged to operably sense the temperature of the target material transmitted from the second output terminal of the flow direction switch device (460) to the material drainage port (404).

10. The material dispensing device (400) of claim 1, further comprising:

a flowmeter (130), coupled with the control circuit (480), and arranged to operably measure a flow of the target material to be dispensed to the target container (190) through the target nozzle (150).

11. The material dispensing device (400) of claim 10, further comprising:

a damper device (120), coupled between an output of the pump (110) and the input terminal of the flow direction switch device (460), and arranged to operably buffer the target material flowing through the damper device (120);

wherein the flowmeter (130) is coupled between the damper device (120) and the flow direction switch device (460), and arranged to operably measure a flow of the target material transmitted from the damper device (120) to the flow direction switch device (460).

12. A material dispensing device (400), comprising:

a target nozzle (150), arranged to operably dispense a target material to a target container (190);

a pump (110), coupled between an outlet connector (182) of a material container (180) and the target nozzle (150), and arranged to operably extract the target material from the material container (180) and to operably push the target material to flow toward the target nozzle (150);

a flowmeter (130), arranged to operably measure a flow of the target material to be dispensed to the target container (190) through the target nozzle (150);

a material drainage port (404);

a flow direction switch device (460), comprising:

an input terminal, arranged to operably receive the target material;

a first output terminal, coupled with the target nozzle (150); and a second output terminal, coupled with the material drainage port (404);

a control circuit (480), coupled with the pump (110), the flowmeter (130), and the flow direction switch device (460), and arranged to operably control the pump (110) and the flow direction switch device (460); and one or more temperature sensors (470), coupled with the control circuit (480), and arranged to operably sense and report the temperature of the target material inside the material dispensing device (400) to the control circuit (480);

wherein when the material dispensing device (400) needs to output the target material to the target container (190), the control circuit (480) evaluates quality of the target material inside the material dispensing device (400) based on sensing results of the one or more temperature sensors (470);

wherein if a temperature of the target material inside the material dispensing device (400) does not reach a predetermined temperature, the control circuit (480) determines that quality of a portion or all of the target material inside the material dispensing device (400) is unacceptable, and deems a portion or all of the target material currently inside the material dispensing device (400) as unqualified material, and then the control circuit (480) controls the flow direction switch device (460) to block the first output terminal and to guide the unqualified material to flow toward the material drainage port (404) through the second output terminal, so as to prevent the target nozzle (150) from dispensing the unqualified material into the target container (190), and the control circuit (480) also controls the pump (110) to operate, so that newly extracted target material is transported from the outlet connector (182) toward the flow direction switch device (460);

wherein with continuous operation of the pump (110), the unqualified material inside the material dispensing device (400) can be pushed to flow forward and gradually discharged to outside through the flow direction switch device (460) and the material drainage port (404), while the newly extracted target material enters and gradually fills a material transmission channel between the outlet connector (182) and the flow direction switch device (460);

afterwards, when the temperature of the target material reaches the predetermined temperature, the control circuit (480) determines that the quality of the target material currently inside the material dispensing device (400) is acceptable, and then the control circuit (480) controls the flow direction switch device (460) to guide the target material to flow toward the target nozzle (150) through the first output terminal, so that the target nozzle (150) dispenses the target material having acceptable quality into the target container (190).

13. The material dispensing device (400) of claim 12, wherein the one or more temperature sensors (470) comprise:

a temperature sensor (470), arranged to operably sense the temperature of the target material transmitted from the outlet connector (182) of the material container (180) to the input terminal of the flow direction switch device (460).

14. The material dispensing device (400) of claim 12, wherein the one or more temperature sensors (470) comprise:

a temperature sensor (470), arranged to operably sense the temperature of the target material transmitted from the second output terminal of the flow direction switch device (460) to the material drainage port (404).

15. The material dispensing device (400) of claim 12, further comprising:

a damper device (120), coupled between the outlet connector (182) and the target nozzle (150), and arranged to operably buffer the target material flowing through the damper device (120).

16. The material dispensing device (400) of claim 15, wherein the damper device (120) is coupled between an output of the pump (110) and the input terminal of the flow direction switch device (460), and the flowmeter (130) is coupled between the damper device (120) and the flow direction switch device (460), and arranged to operably measure a flow of the target material transmitted from the damper device (120) to the flow direction switch device (460).

* * * * *